(12) United States Patent
Nonaka et al.

(10) Patent No.: US 8,346,970 B2
(45) Date of Patent: Jan. 1, 2013

(54) DATA RELAY DEVICE, DATA RECEIVING DEVICE AND COMMUNICATION SYSTEM

(75) Inventors: Hiroshi Nonaka, Kawasaki (JP); Tsuyoshi Fujihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/926,495

(22) Filed: Nov. 22, 2010

(65) Prior Publication Data
US 2011/0072160 A1    Mar. 24, 2011

Related U.S. Application Data

(63) Continuation of application No. PCT/JP2008/059918, filed on May 29, 2008.

(51) Int. Cl.
*G06F 15/16* (2006.01)
(52) U.S. Cl. ......................... 709/246; 370/231
(58) Field of Classification Search .................. 709/246; 370/231
See application file for complete search history.

(56) References Cited

U.S. PATENT DOCUMENTS

| | | | |
|---|---|---|---|
| 5,933,605 A | 8/1999 | Kawano et al. | |
| 6,469,983 B2 * | 10/2002 | Narayana et al. | 370/231 |
| 6,810,037 B1 * | 10/2004 | Kalapathy et al. | 370/392 |
| 2001/0003194 A1 | 6/2001 | Shimura et al. | |
| 2003/0046415 A1 | 3/2003 | Kaijyu et al. | |
| 2004/0039833 A1 * | 2/2004 | Ludwig et al. | 709/230 |
| 2004/0201683 A1 * | 10/2004 | Murashita et al. | 348/207.1 |
| 2005/0008236 A1 * | 1/2005 | Hachiyama et al. | 382/233 |
| 2005/0086325 A1 * | 4/2005 | Slipp et al. | 709/219 |
| 2006/0106946 A1 * | 5/2006 | Agarwal et al. | 709/250 |
| 2007/0183107 A1 * | 8/2007 | Okada | 361/62 |
| 2009/0006839 A1 * | 1/2009 | Matsuoka et al. | 713/150 |

FOREIGN PATENT DOCUMENTS

| | | |
|---|---|---|
| JP | 4-354263 | 12/1992 |
| JP | 7-210473 | 8/1995 |
| JP | 9-135262 | 5/1997 |
| JP | 2001-154983 | 6/2001 |
| JP | 2003-58445 | 2/2003 |
| JP | 2003-67277 | 3/2003 |
| JP | 2003-308269 | 10/2003 |
| JP | 2004-310490 | 11/2004 |
| JP | 2005-227911 | 8/2005 |
| JP | 2006-280558 | 10/2006 |
| JP | 2007-213338 | 8/2007 |
| JP | 2007-310662 | 11/2007 |
| JP | 2008-112339 | 5/2008 |

OTHER PUBLICATIONS

International Search Report for PCT/JP2008/059918 mailed Sep. 2, 2008.
Japanese Office Action issued Jul. 24, 2012 in corresponding Japanese Patent Application No. 2010-514292.

* cited by examiner

*Primary Examiner* — Thomas Dailey
(74) *Attorney, Agent, or Firm* — Staas & Halsey LLP

(57) ABSTRACT

A data relay device has a reception processing unit for dividing transmitted data into data blocks to store in a storage unit together with labels for managing the data blocks, a manipulation processing unit for manipulating the data blocks stored in the storage unit and a transmission processing unit for transmitting the data blocks of which manipulation is completed to a destination. Since the reception processing unit divides the transmitted data while receiving the same, the reception processing unit, the manipulation processing unit and the transmission processing unit may operated in parallel, thereby realizing reduction of time required to relay the transmitted data.

7 Claims, 23 Drawing Sheets

DIVISION MANAGEMENT INFORMATION
STORAGE UNIT

51

```
<TRANSMITTED DATA ID>1234</TRANSMITTED DATA ID>
<SOURCE>192.168.0.1</SOURCE>
<DESTINATION>192.168.10.23</DESTINATION>
<FORMAT>FORMAT01</FORMAT>
<DATA DEFINITION>
  <OFFSET>0</OFFSET>
  <SIZE>256</SIZE>
  <DATA TYPE>HEADER</DATA TYPE>
</DATA DEFINITION>
<DATA DEFINITION>
  <OFFSET>256</OFFSET>
  <SIZE>650</SIZE>
  <DATA TYPE>TEXT</DATA TYPE>
</DATA DEFINITION>
<DATA DEFINITION>
  <OFFSET>906</OFFSET>
  <SIZE>1050</SIZE>
  <DATA TYPE>JPEG IMAGE</DATA TYPE>
</DATA DEFINITION>
<DATA NUMBER>1</DATA NUMBER>
<BLOCK NUMBER>1</BLOCK NUMBER>
```

| DATA TYPE | MANIPULATION METHOD AT RELAY | MANIPULATION METHOD |
|---|---|---|
| TEXT | ZIP COMPRESSION | ZIP DECOMPRESSION |
| JPEG IMAGE | REDUCTION (320x240) | NO MANIPULATION |
| | NO MANIPULATION | NO MANIPULATION |
| ... | ... | ... |

DATA RELAY DEVICE, DATA RECEIVING DEVICE AND COMMUNICATION SYSTEM

CROSS-REFERENCE TO RELATED APPLICATION

This application is a continuation of International Application No. PCT/JP2008/059918, filed on May 29, 2008, the entire contents of which are incorporated herein by reference.

FIELD

The embodiment discussed herein is directed to a data relay device, a data receiving device and a communication system related to data relay.

BACKGROUND

When a plurality of information processing devices communicate with each other, there is a case in which the data relay device is arranged between the information processing devices. The data relay device is a device for receiving the transmitted data transmitted from the information processing device of a source on a communication path to transfer to the information processing device of a destination.

The data relay device is arranged in order to reduce a communication amount, for example. By compressing the transmitted data transmitted from the information processing device of the source to transfer to the destination by a data relay processing device, an information amount to be transmitted may be reduced. In addition to this, the data relay device is arranged in order to filter so as to prevent inadequate information from being transmitted.

Patent Document 1: Japanese Laid-open Patent Publication No. 07-210473
Patent Document 2: Japanese Laid-open Patent Publication No. 09-135262
Patent Document 3: Japanese Laid-open Patent Publication No. 2007-310662

However, the conventional data relay device has a problem that the time required for the data transmission is long. For example, in a case of the data relay device for compressing the transmitted data to transfer, a compression process is performed and the transmitted data after the compression is transferred to the destination after receiving entire transmitted data, so that the data transmitting time is longer by the compression process.

SUMMARY

According to an aspect of an embodiment of the invention, a communication system includes a first information processing device; a second information processing device; and a data relay device for relaying communication between the first and second information processing devices. The data relay device includes a first receiving unit that receives transmitted data transmitted from the first information processing device; a dividing unit that divides the transmitted data while being received by the first receiving unit into one or a plurality of blocks for each type of data included in the transmitted data; a storing unit that stores the block divided by the dividing unit and block management information in which positional information indicating a position of the block in the transmitted data and type information indicating a type of the data including the block in such a way that the block and the block management information are associated with each other; a first manipulation judging unit that checks the type information set in the block management information stored in the storage unit against manipulation definition information in which a manipulation method is defined in advance for each type of the data, thereby judging the manipulation method executed to the block corresponding to the block management information; a first manipulating unit that manipulates the block stored in the storage unit based on the manipulation method judged by the first manipulation judging unit; and a transmitting unit that transmits the block manipulated by the first manipulating unit to the second information processing device together with the block management information associated with the block to be stored in the storage unit. The second information processing device includes a second receiving unit that receives the block and the block management information; a second manipulation judging unit that judges the manipulation method executed to the block corresponding to the block management information based on the type information included in the block management information; a second manipulating unit that manipulates the block based on the manipulation method judged by the second manipulation judging unit; and a reconfiguring unit that combines the block manipulated by the second manipulating unit with another block based on the positional information included in the block information corresponding to the block to reconfigure the transmitted data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5B depicts an example of division management information.

DESCRIPTION OF EMBODIMENT

A preferred embodiment of the present invention will be explained with reference to accompanying drawings. Meanwhile, the invention is not limited by the embodiment.

Figure 1:
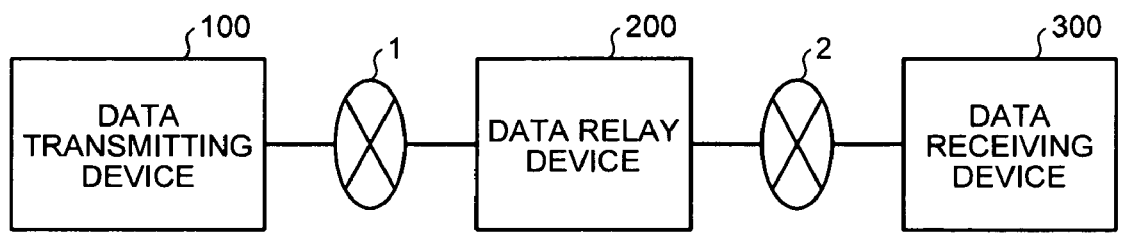
FIG. 1 depicts an example of a communication system including a data relay device according to this embodiment.

First, the communication system including a data relay device 200 according to the embodiment is described. FIG. 1 depicts an example of the communication system including the data relay device 200 according to the embodiment. As illustrated in FIG. 1, the data relay device 200 is connected to a data transmitting device 100 through a network 1 such as a local area network (LAN) and the Internet. The data relay device 200 is also connected to a data receiving device 300 through a network 2 such as the LAN and the Internet.

The data transmitting device 100 is an information processing device for transmitting transmitted data to the data receiving device 300, which corresponds to a server device, a personal computer or a mobile terminal, for example. The data receiving device 300 is the information processing device for receiving the transmitted data transmitted from the data transmitting device 100, which corresponds to the server device, the personal computer or the mobile terminal, for example.

The data relay device 200 is the information processing device for manipulating the transmitted data transmitted from the data transmitting device 100 to transfer to the data receiving device 300. The manipulation applied to the transmitted data by the data relay device 200 differs depending on a type of data included in the transmitted data, a destination of the transmitted data and the like. For example, the data relay device 200 compresses text data out of the data included in the transmitted data to transfer to the data receiving device 300.

Meanwhile, although an example in which one data transmitting device 100 and one data receiving device 300 are present is illustrated in FIG. 1, the data relay device 200 may relay the transmitted data also in a case in which a plurality of data transmitting devices 100 and data receiving devices 300 are present. It is not required that roles of the data transmitting device 100 and the data receiving device 300 be fixed. That is to say, in a certain case, the data receiving device 300 may transmit the transmitted data and the data transmitting device 100 may receive the transmitted data relayed by the data relay device 200.

Figure 2:
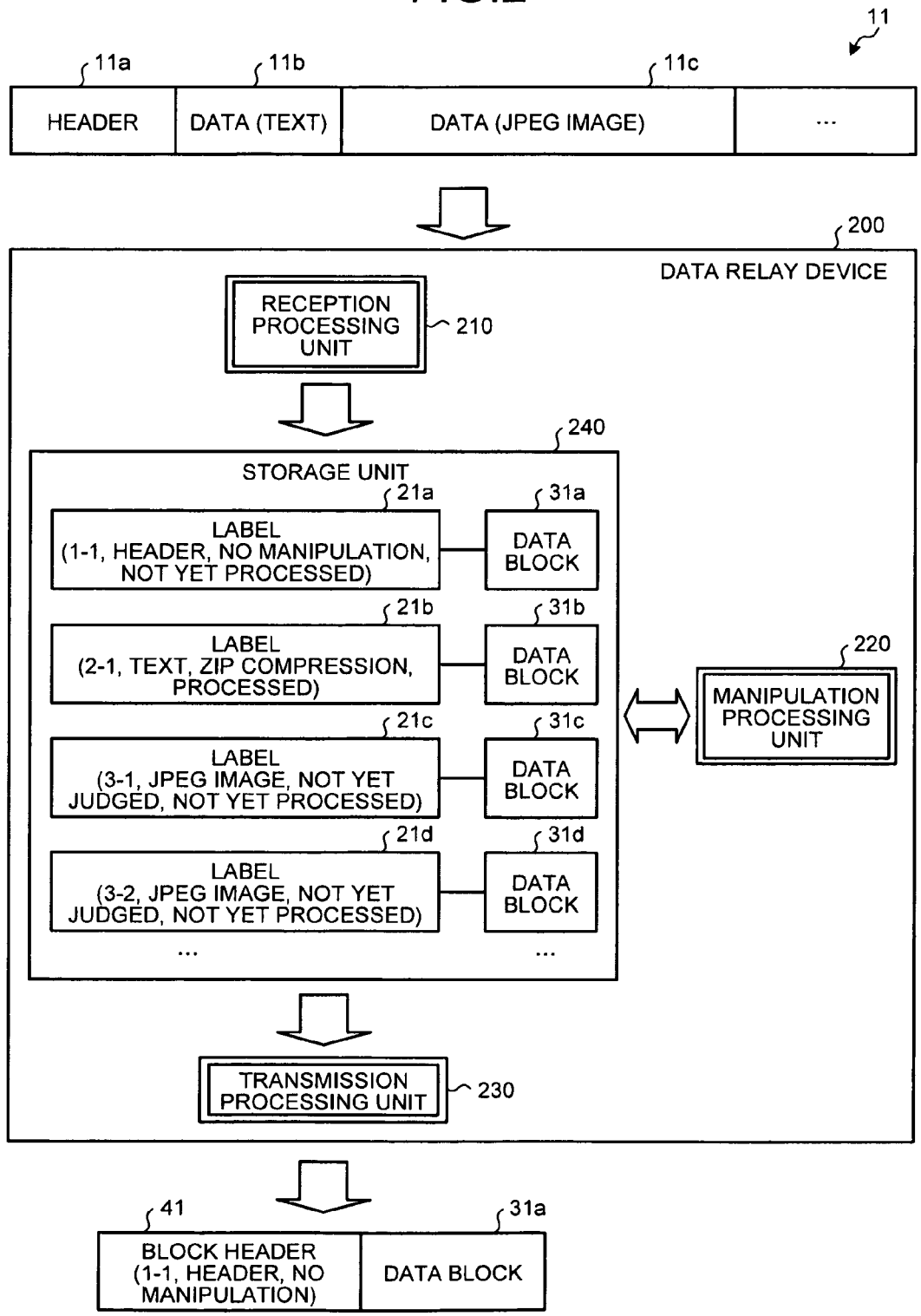
FIG. 2 depicts a functional overview of the data relay device.

Next, a functional overview of the data relay device 200 is described. FIG. 2 is the functional overview of the data relay device 200. As illustrated in FIG. 2, the data relay device 200 has a reception processing unit 210, a manipulation processing unit 220 and a transmission processing unit 230, and is configured such that they operate in parallel.

The reception processing unit 210 divides the transmitted data transmitted from the data transmitting device 100 into data blocks not longer than predetermined length for each type of the data while receiving the same to store in a storage unit 240 of the data relay device 200. When the reception processing unit 210 stores the data blocks in the storage unit 240, this generates a label in which positional information indicating a position of the data block in the transmitted data, a data type indicating a type of the data included in the data block and the like are set. Then, the reception processing unit 210 associates the generated label with the data block to store in the storage unit 240.

The manipulation processing unit 220 monitors the storage unit 240, and when the label of which contents are not confirmed is stored therein, this refers to the data type of the label to judge the manipulation necessary for the data block corresponding to the label. Then, the manipulation processing unit 220 sets a result of judgment in the label as a manipulation method. Further, the manipulation processing unit 220 executes the manipulation judged to be necessary to the data block, and upon completion of the manipulation, this sets the completion of the manipulation as a status in the label. Meanwhile, when the manipulation processing unit 220 judges that the manipulation of the data block is not necessary, this sets unnecessity of the manipulation of the data block in the corresponding label and does not manipulate the data block.

The transmission processing unit 230 monitors the storage unit 240, and when there is the label in which the completion of the manipulation of the data block is set, this generates a block header in which the positional information and the like set in the label is set. Then, the transmission processing unit 230 adds the block header to the data block corresponding to the label to transmit to the destination. Also, the transmission processing unit 230 monitors the storage unit 240, and when there is the label in which the unnecessity of the manipulation of the data block is set, this generates the block header in which the positional information and the like set in the label is set. Then, the transmission processing unit 230 adds the block header to the data block corresponding to the label to transmit to the destination.

For example, when transmitted data 11 including a header 11a in which a source address, a destination address and the like are set, data 11b being text data and data 11c being image data in a JPEG format is received, the data relay device 200 operates as follows.

The reception processing unit 210 divides the transmitted data 11 into the data blocks while receiving the same, divides the header 11a as a data block 31a to store in the storage unit 240, and generates a label 21a corresponding to the data block 31a to store in the storage unit 240. In the label 21a, "1-1" is set as the positional information and "header" is set as the data type.

Meanwhile, a number in a part before "-" of "1-1" being the positional information indicates an order of the data included in the corresponding data block in the transmitted data. Also, a number in a part after "-" indicates an order of the corresponding data block obtained by dividing the data. That is to say, "1-1" indicates that the corresponding data block is a first block obtained by dividing first data in the transmitted data.

Subsequently, the reception processing unit 210 divides the data 11b as a data block 31b to store in the storage unit 240, and generates a label 21b corresponding to the data block 31b to store in the storage unit 240. In the label 21b, "2-1" is set as the positional information and "text" is set as the data type.

Subsequently, the reception processing unit 210 divides the data 11c into the data blocks. In an example illustrated in FIG. 2, the reception processing unit 210 divides the data 11c into data blocks 31c and 31d. In this manner, the reception processing unit 210 divides the data according to a timing and length of an already received part while receiving a piece of the data included in the transmitted data. By dividing the data into a plurality of data blocks to store in the storage unit 240, time required to store each data block in the storage unit 240 may be reduced, and a timing to start the process for the data blocks may be accelerated.

Then, the reception processing unit 210 generates a label 21c corresponding to the data block 31c to store in the storage unit 240, and generates a label 21d corresponding to the data block 31d to store in the storage unit 240. In the label 21c, "3-1" is set as the positional information and "JPEG image" is set as the data type. In the label 21d, "3-2" is set as the positional information and "JPEG image" is set as the data type.

Meanwhile, at a time point at which the reception processing unit 210 stores the label in the storage unit 240, in each label, "not yet judged" is set as the manipulation method and "not yet processed" is set as the status. "Not yet judged" is a value indicating that the manipulation method is not judged yet, and "not yet processed" is a value indicating that the manipulation is not executed yet.

In parallel with the above-described operation of the reception processing unit 210, the manipulation processing unit 220 refers to the data type of each label stored in the storage unit 240 to judge the manipulation method of the corresponding data block, and manipulates the data block when the manipulation is necessary.

In the example illustrated in FIG. 2, the manipulation processing unit 220 refers to the data type of the label 21a to judge that the manipulation is not necessary for the data block 31a and sets "no manipulation" as the manipulation method in the label 21a.

Also, the manipulation processing unit 220 refers to the data type of the label 21b to judge that a compression process is necessary for the data block 31b and sets "ZIP compression" as the manipulation method in the label 21b. Then, the manipulation processing unit 220 executes the compression process to the data block 31b, and thereafter sets "processed" as the status in the label 21b. "Processed" is a value indicating that the manipulation is completed.

Meanwhile, at that time, the manipulation processing unit 220 does not judge the manipulation method of the data blocks 31c and 31d yet, so that "not yet judged" is still set as the manipulation method and "not yet processed" is still set as the status in the labels 21c and 21d.

In parallel with the above-described operations of the reception processing unit 210 and the manipulation processing unit 220, the transmission processing unit 230 refers to each label stored in the storage unit 240 to execute a transmission process of the data block. Specifically, the transmission processing unit 230 selects the data block corresponding to the label in which "no manipulation" is set as the manipulation method and the data block corresponding to the label in which "processed" is set as the status as transmission objects. Then, the transmission processing unit 230 generates the block header from the label corresponding to the data block being the transmission object and adds the generated block header to the data block to transmit to the data receiving device 300.

In the block header, information required to reconfigure the transmitted data 11 in the data receiving device 300 out of the information set in the label is set. In the example illustrated in FIG. 2, the data block 31a corresponding to the label 21a in which "no manipulation" is set as the manipulation method is the transmission object. Then, out of the information set in the label 21a, the information other than the status, which is the information not necessary to reconfigure the transmitted data 11, is set in a block header 41 to be transmitted to the data receiving device 300 together with the data block 31a.

After a scene illustrated in FIG. 2, the data block 31b corresponding to the label 21b in which "processed" is set as the status becomes the transmission object. Then, after the process by the manipulation processing unit 220 is completed, the data block 31c corresponding to the label 21c and the data block 31d corresponding to the label 21d also become the transmission objects.

In this manner, all the data blocks obtained by dividing the transmitted data 11 are transmitted to the data receiving device 300 together with the block headers. Then, the data receiving device 300 judges the position of the data block in the transmitted data 11 based on the positional information set in the block header. Also, the data receiving device 300 judges how original data of the data included in the data block is and how this is manipulated based on the data type and the manipulation method set in the block header. Then, the data receiving device 300 reconfigures the transmitted data 11 based on the result of judgment.

Meanwhile, in this application, a term "reconfiguration" is not necessarily intended to mean complete reproduction of the transmitted data 11 transmitted from the data transmitting device 100. For example, when the data relay device 200 reduces the image data included in the transmitted data 11 according to resolution of a display unit of the data receiving device 300, the data receiving device 300 reconfigures the transmitted data 11 by using the reduced image data.

In this manner, the data relay device 200 is configured such that the reception processing unit 210 divides the transmitted data into the data blocks, and in parallel with this, the manipulation processing unit 220 executes a manipulation process and the transmission processing unit 230 executes the transmission process. Therefore, in the data relay device 200, time required to relay the transmitted data is significantly reduced as compared to that in a conventional case.

Figure 3:
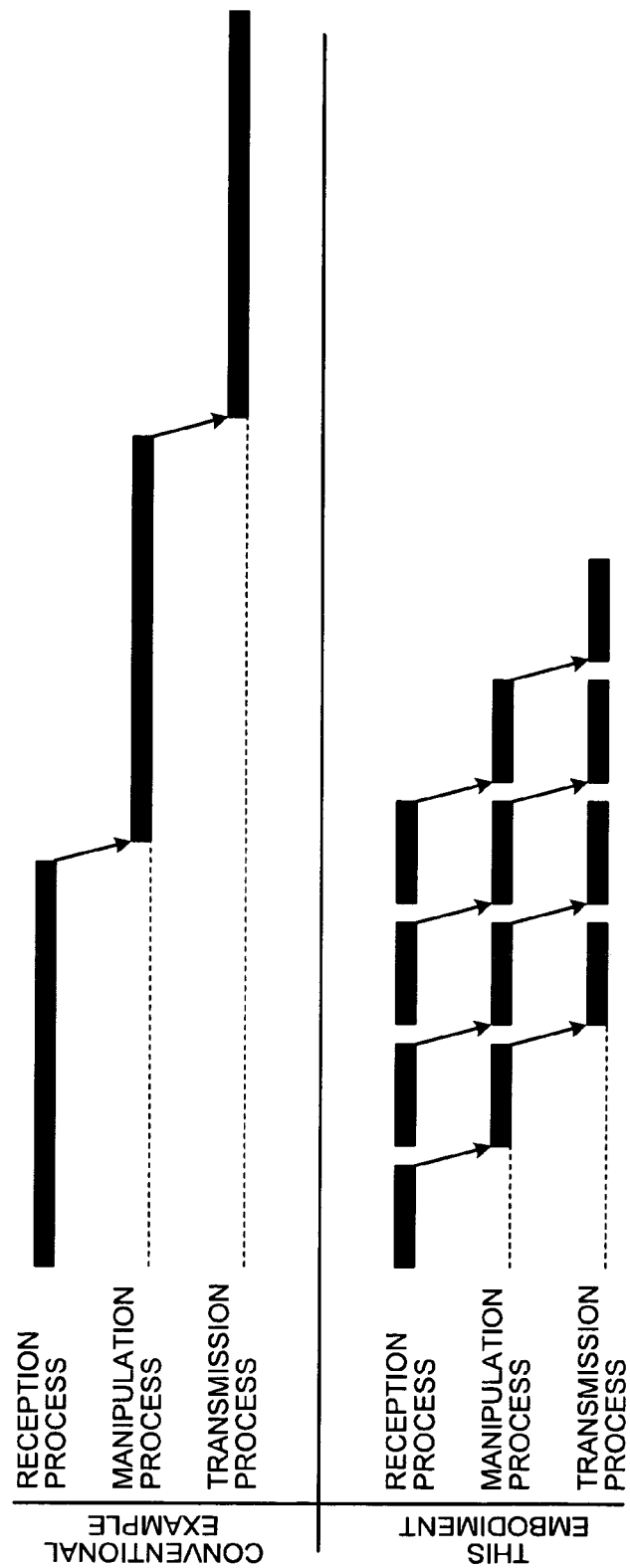
FIG. 3 depicts difference in time required to relay the transmitted data.

FIG. 3 depicts difference in time required to relay the transmitted data. As illustrated in FIG. 3, in a conventional data relay device, the manipulation of the data is executed after entire transmitted data is received, and the transmission process is executed after the manipulation process of the entire data is completed. Therefore, in the conventional data relay device, the time required to relay the transmitted data is not shorter than the total time required for a reception process, the manipulation process and the transmission process.

On the other hand, in the data relay device 200, since the reception process, the manipulation process and the transmission process progress in parallel in a unit of data block, the time required to relay the transmitted data is significantly shorter than the total time required for the reception process, the manipulation process and the transmission process. Also, in the data relay device 200, since the data block of which transmission is completed may be deleted from the storage unit 240, it is not required to store the entire transmitted data and capacity of the storage unit 240 may be made small.

Figure 4:
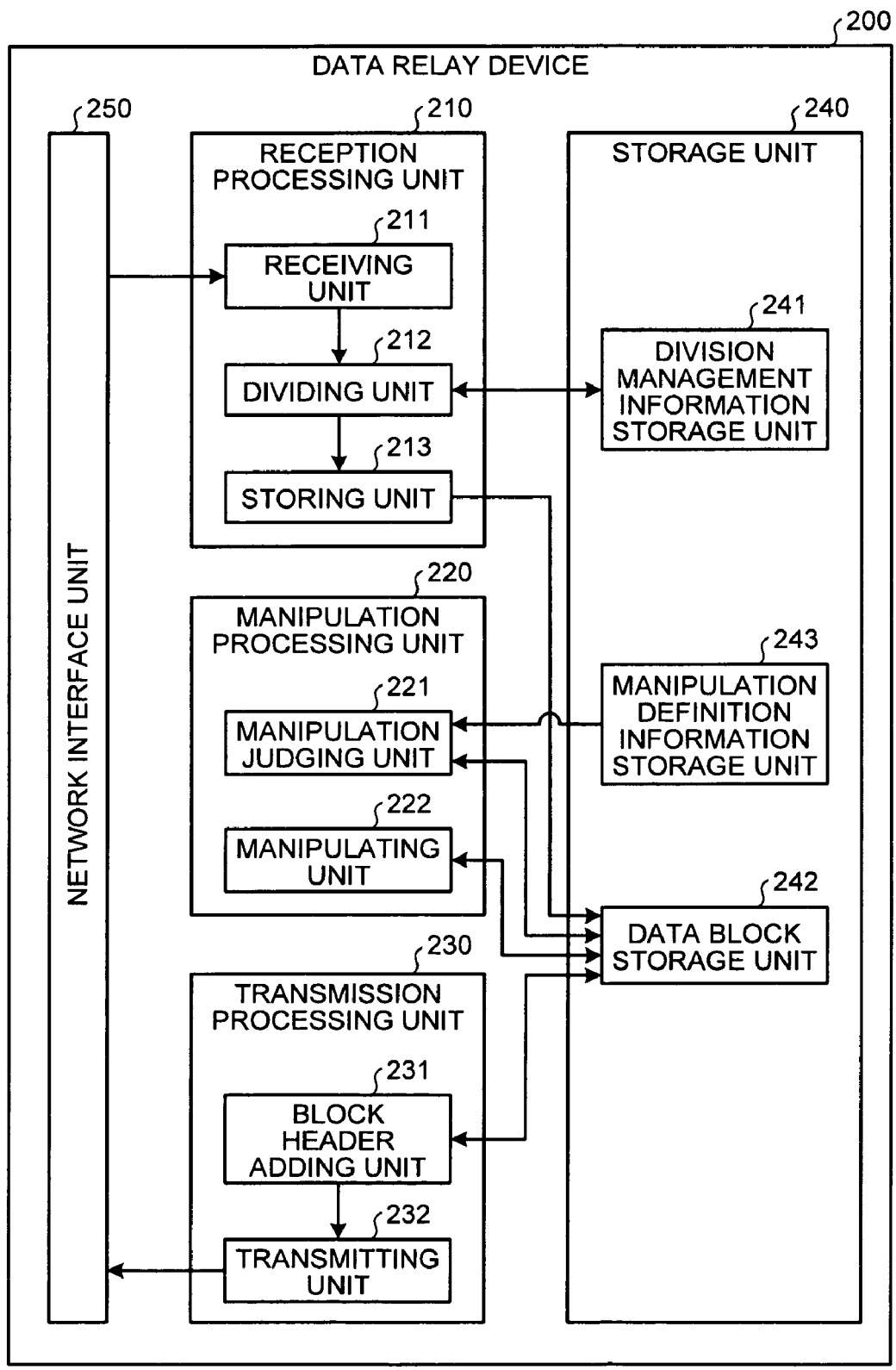
FIG. 4 is a block diagram illustrating a configuration of the data relay device.

Next, a configuration of the data relay device 200 is described in more detail. FIG. 4 is a block diagram illustrating the configuration of the data relay device 200. As illustrated in FIG. 4, the data relay device 200 has the reception processing unit 210, the manipulation processing unit 220, the transmission processing unit 230, the storage unit 240 and a network interface unit 250. The network interface unit 250 is an interface device for communicating with another information processing device through the network.

The reception processing unit 210 has a receiving unit 211, a dividing unit 212, and a storing unit 213. The receiving unit 211 receives the transmitted data transmitted from the data transmitting device 100 by a predetermined size and sequentially passes a fragment of the received transmitted data to the dividing unit 212.

The dividing unit 212 analyzes contents of the fragment passed from the receiving unit 211, thereby analyzing a format of the transmitted data and stores a result of analysis in a division management information storage unit 241 of the storage unit 240. Then, the dividing unit 212 decomposes the fragment passed from the receiving unit 211 into the data blocks for each type of the data based on the information stored in the division management information storage unit 241 and generates the label corresponding to each data block.

The storing unit 213 associates each data block divided by the dividing unit 212 with the corresponding label to store in a data block storage unit 242 of the storage unit 240.

Figure 5A:
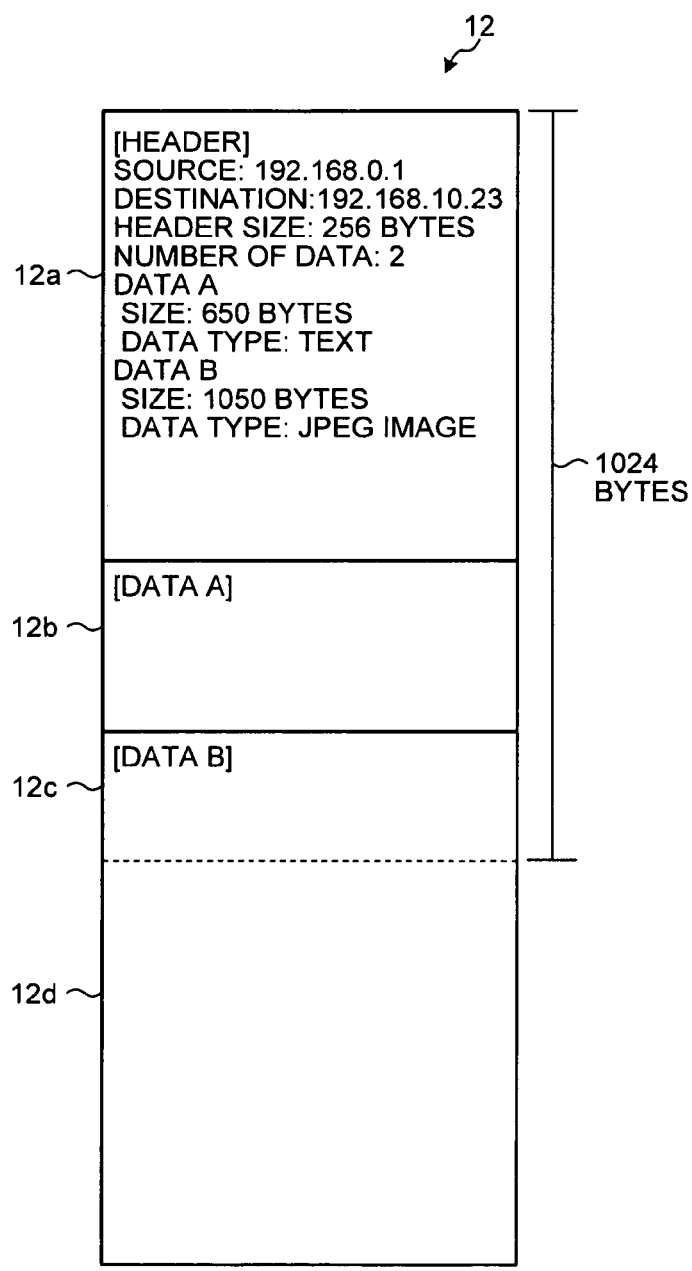
FIG. 5A depicts an example of transmitted data.

Herein, operation of each unit of the reception processing unit 210 is described by a specific example. FIG. 5A depicts an example of the transmitted data transmitted from the data transmitting device 100. Transmitted data 12 illustrated in FIG. 5A has a header, data A and data B. The header includes information regarding the format of the transmitted data 12 in addition to addresses of the source and the destination.

Specifically, it is set in the header that a size of the header is 256 bytes and that two pieces of data are included other than the header in the transmitted data 12. Also, it is set in the header that a size of first data, that is to say, the data A is 650 bytes and that the data type of the data A is "text". Also, it is set in the header that the size of second data, that is to say, the data B is 1050 bytes and the data type of the data B is "JPEG image".

The receiving unit 211 receives the transmitted data 12 by the predetermined size as described above. Herein, suppose that the receiving unit 211 receives the transmitted data 12 by 1024 bytes. In this case, the receiving unit 211 first receives a first 1024-byte part of the transmitted data 12, that is to say, the header, the data A and a top part of the data B, and passes the part to the dividing unit 212 as a first fragment.

When the dividing unit 212 receives the first fragment from the receiving unit 211, this extracts information necessary for a division process from the header included in the fragment to generate division management information 51 to store in the division management information storage unit 241. An example of the division management information 51 generated based on the header is illustrated in FIG. 5B. Meanwhile, although the division management information 51 is created in an extensible markup language (XML) format in the example illustrated in FIG. 5B, the division management information 51 may be in a format other than the XML format.

As illustrated in FIG. 5B, there are items such as a transmitted data ID, the source, the destination, the format, data definition, a data number and a block number in the division management information 51. The transmitted data ID is a number to identify the transmitted data, and different value is set for each transmitted data. The source is the address of the source of the transmitted data, and the destination is the address of the destination of the transmitted data. The format is the format of the transmitted data, and "format 01" is herein set.

The data definition is the item provided for each data included in the transmitted data and includes the items such as offset, the size and the data type. The offset is an appearance position of the data seen from the top of the transmitted data and a value obtained by summing up the sizes of the data located before the data is set. The size is the size of the data, and the data type is the type of the data.

The data number is a number indicating the order of the data to which the data block to be clipped belongs. The block number is a number indicating the order of the data block to be clipped in the data. As the data number, 1 is set as an initial value, and the dividing unit 212 adds 1 to the data number each time this starts the process of different data. As the block number, 1 is set as an initial value, and the dividing unit 212 initializes the block number to 1 each time this starts the process of different data and adds 1 to the block number each time this clips the data block.

The dividing unit 212 clips the header, the data A and the top part of the data B as data blocks 12a, 12b and 12c, respectively, based on values of the offset and the size of each data definition set in the division management information 51. Then, the dividing unit 212 updates the data number and the block number of the division management information 51 while clipping each block, and generates the label for each clipped data block. Then, each clipped data block is associated with the corresponding label to be stored in the data block storage unit 242 by the storing unit 213.

Subsequently, the receiving unit 211 receives a subsequent part of the transmitted data 12, that is to say, a remaining part of the data B and passes the part to the dividing unit 212 as a next fragment. The dividing unit 212 clips an entire passed fragment as a data block 12d based on the values of the offset and the size of each data definition set in the division management information 51. Then, the dividing unit 212 updates the block number of the division management information 51 and generates the label corresponding to the data block 12d. Then, the data block 12d is associated with the corresponding label to be stored in the data block storage unit 242 by the storing unit 213.

Figure 5C:
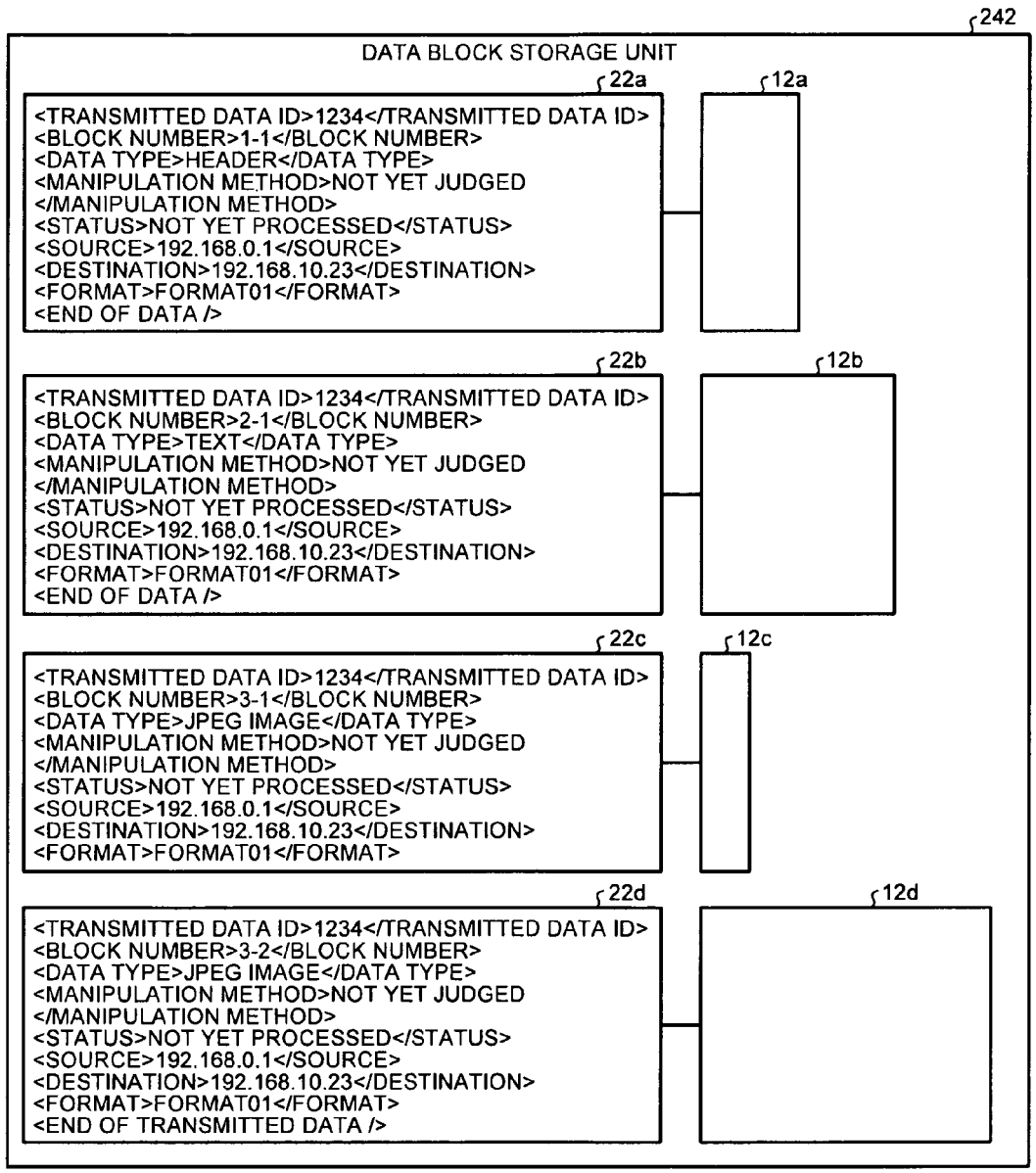
FIG. 5C depicts an example of a combination of a data block and a label stored in a data block storage unit.

As a result of the above-described process, a combination of the data block and the label as illustrated in FIG. 5C is stored in the data block storage unit 242. In an example illustrated in FIG. 5C, labels 22a to 22d are associated with the data blocks 12a to 12d, respectively, to be stored. Each label includes the items such as the transmitted data ID, the block number, the manipulation method, the status, the source, the destination and the format as common items. Meanwhile, although the labels 22a to 22d are created in the XML format in the example illustrated in FIG. 5C, the labels 22a to 22d may be in a format other than the XML format.

The transmitted data ID is a number to identify the transmitted data, and a value of the transmitted data ID of the division management information 51 is set without change. The block number is the positional information indicating the position of the data block in the transmitted data. For example, the block number "3-2" means that the data block corresponding to the label is a second data block obtained by dividing third data in the transmitted data. The block number is set based on values of the data number and the block number of the division management information 51 at a time point at which the data block is clipped.

The manipulation method is the item in which the manipulation method, which should be executed to the data block corresponding to the label, is set, and "not yet judged" is set as an initial value. The status is the item in which a progress situation of the manipulation, which should be executed to the data block corresponding to the label, is set, and "not yet processed" is set as an initial value. The source, the destination and the format are the items in which the source address, the destination address and the format of the transmitted data are set, respectively, and values of the source, the destination and the format of the division management information 51 are set without change.

There is a case in which a data ending flag or a transmitted data ending flag is set in the label in addition to the above-described common items. The data ending flag is set when the data block corresponding to the label is the last data block clipped from certain data. Also, the transmitted data ending flag is set when the data block corresponding to the label is the last data block clipped from the transmitted data. These flags are set in the block header transmitted together with the data block and used when the data receiving device 300 confirms presence or absence of lack of the data block.

In the example illustrated in FIG. 5C, since the data block 12a is the last data block clipped from the header, <END OF DATA/> is set as the data ending flag in the label 22a corresponding to the data block 12a. Also, since the data block 12b is the last data block clipped from the data A, <END OF DATA/> is set as the data ending flag in the label 22b corresponding to the data block 12b. Also, since the data block 12d is the last data block clipped from the transmitted data 12, <end of transmitted data/> is set as the transmitted data ending flag in the label 22d corresponding to the data block 12d.

Meanwhile, although the example to divide the transmitted data in the header of which the size of each data is set into the data blocks is illustrated in the description above, the reception processing unit 210 may divide the transmitted data without the size of each data set in the header into the data blocks. Then, the operation of the reception processing unit 210 when dividing the transmitted data without the size of each data set in the header is described with reference to FIGS. 6A to 6C.

Figure 6A:
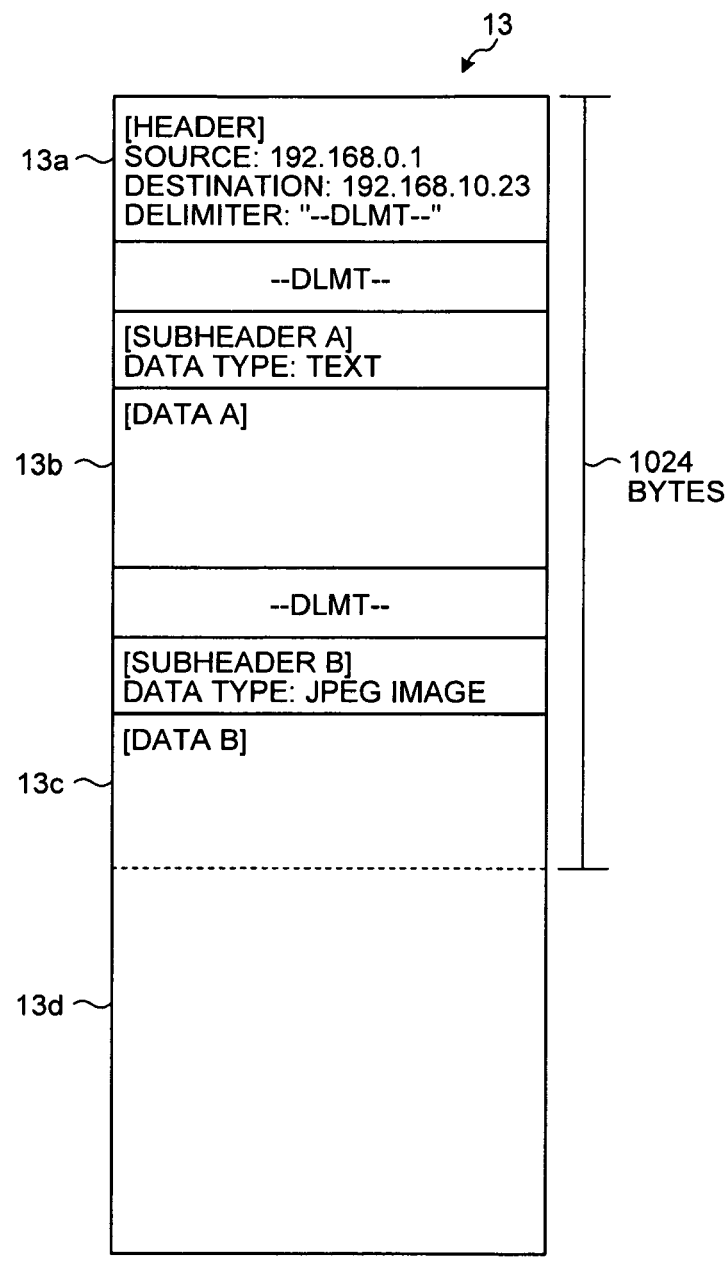
FIG. 6A depicts an example of the transmitted data.

FIG. 6A depicts an example of the transmitted data without the size of each data set in the header. Transmitted data 13 illustrated in FIG. 6A has a format in which the head, a combination of a subheader A and the data A, and a combination of a subheader B and the data B are separated by a delimiter character. The header includes definition that the delimiter character is "—DLMT—" in addition to the addresses of the source and the destination. The subheader A includes information regarding the type of the data A and the subheader B includes information regarding the type of the data B.

Herein, suppose that the receiving unit 211 receives the transmitted data 13 by 1024 bytes. In this case, the receiving unit 211 first receives the first 1024-byte part of the transmitted data 13, that is to say, the header, a first delimiter character, the subheader A, the data A, a second delimiter character, the subheader B and a top part of the data B, and passes the part to the dividing unit 212 as the first fragment.

Figure 6B:
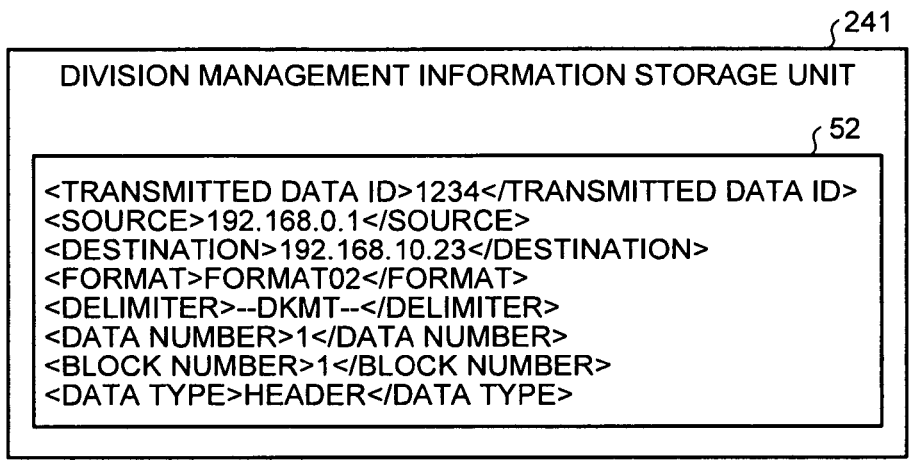
FIG. 6B depicts an example of the division management information.

When the dividing unit 212 receives the first fragment from the receiving unit 211, this extracts the information necessary for the division process from the header included in the fragment to generate division management information 52 and stores the same in the division management information storage unit 241. An example of the division management information 52 generated based on the header is illustrated in FIG. 6B. Meanwhile, although the division management information 52 is created in the XML format in the example illustrated in FIG. 6B, the division management information 52 may be a format other than the XML format.

As illustrated in FIG. 6B, there are the items such as the transmitted data ID, the source, the destination, the format, the data number, the block number and the data type in the division management information 52. The transmitted data ID is the number to identify the transmitted data and the different value is set for each transmitted data. The source is the address of the source of the transmitted data and the destination is the address of the destination of the transmitted data. The format is the format of the transmitted data and "format 02" is herein set.

Delimiter is the delimiter character and a character string defined as the delimiter character in the header is set. The data number is the number indicating the order of the data to which the data block to be clipped belongs. The block number is the number indicating the order of the data block to be clipped in the data. The data type is the type of data to which the data block to be clipped belongs. As the data type, "header" is set as an initial value and each time a new sub header is detected, a value of the data type set in the subheader is set.

The dividing unit 212 detects the two delimiter characters based on a value of the delimiter set in the division management information 52 and clips a part before the first delimiter character as a data block 13a. Then, the dividing unit 212 generates the label corresponding to the clipped data block. The clipped data block 13a is associated with the corresponding label to be stored in the data block storage unit 242 by the storing unit 213.

Subsequently, the receiving unit 211 obtains a part interposed between the two delimiter characters and clips the data A as a data block 13b. Then, the dividing unit 212 sets the value of the data type set in the subheader A in the division management information 52 and updates the data number and the block number to generate the label corresponding to the data block 13b. The clipped data block 13b is associated with the corresponding label to be stored in the data block storage unit 242 by the storing unit 213.

Subsequently, the receiving unit 211 obtains a part after the second delimiter character and clips the top part of the data B as a data block 13c. Then, the dividing unit 212 sets the value of the data type set in the subheader B in the division management information 52 and updates the data number and the block number to generate the label corresponding to the data block 13c. The clipped data block 13c is associated with the corresponding label to be stored in the data block storage unit 242 by the storing unit 213.

Subsequently, the receiving unit 211 receives a subsequent part of the transmitted data 13, that is to say, a remaining part of the data B, and passes the part to the dividing unit 212 as the next fragment. Although the dividing unit 212 tries to detect the delimiter character based on the value of the delimiter set in the division management information 52, the delimiter character is not detected in this case. Then, the dividing unit 212 clips an entire received fragment as a data block 13d. Then, the dividing unit 212 updates the block number of the division management information 52 and generates the label corresponding to the data block 13d. The data block 13d is associated with the corresponding label to be stored in the data block storage unit 242 by the storing unit 213.

Figure 6C:
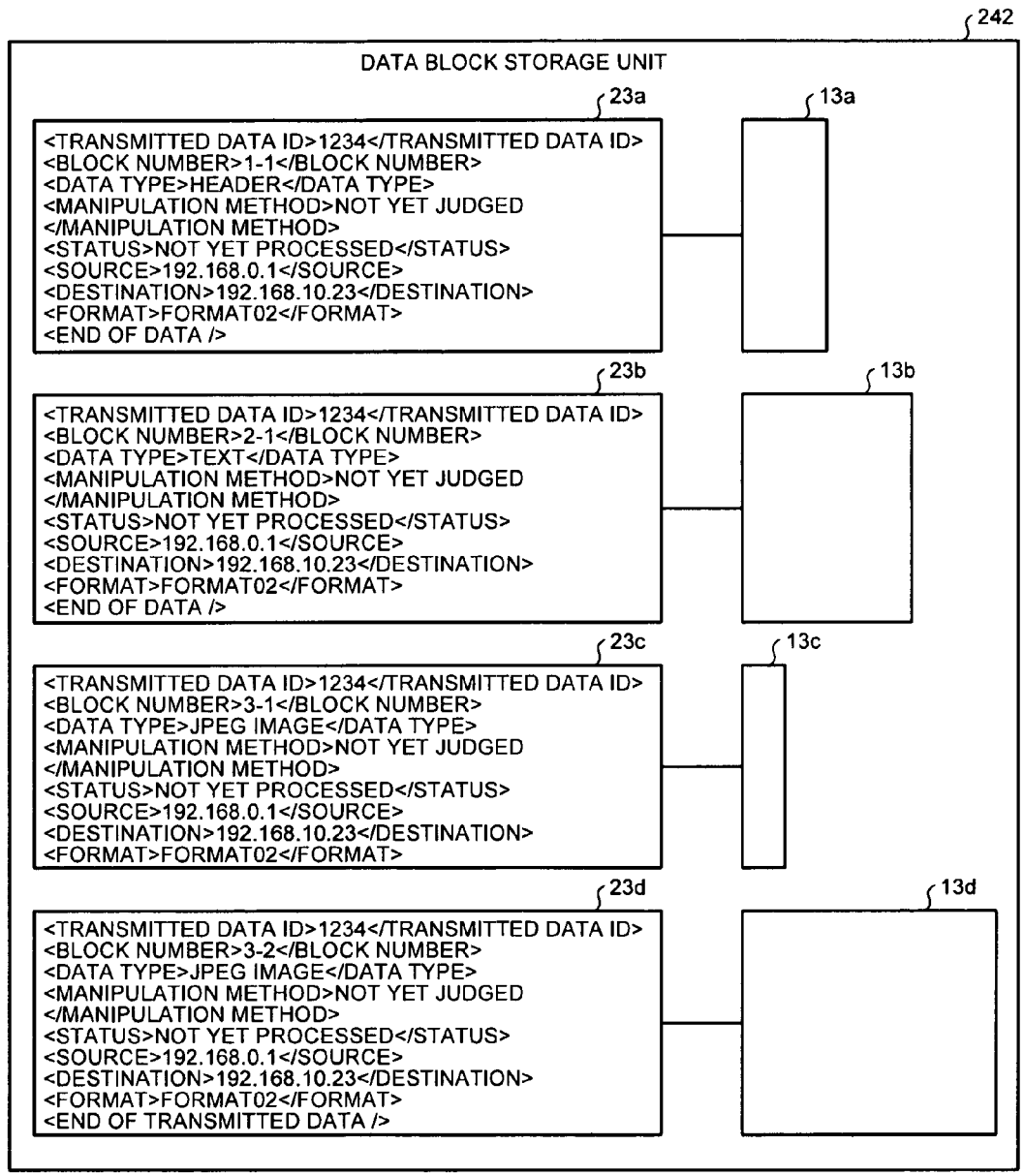
FIG. 6C depicts an example of the combination of the data block and the label stored in the data block storage unit.

As a result of the above-described process, the combination of the data block and the label as illustrated in FIG. 6C is stored in the data block storage unit 242. In an example illustrated in FIG. 6C, labels 23a to 23d are associated with the data blocks 13a to 13d, respectively, to be stored. Since the set items of the labels 23a to 23d are similar to those of the labels 22a to 22d except the item of the format, the description thereof is herein omitted.

Figures 7, 8:
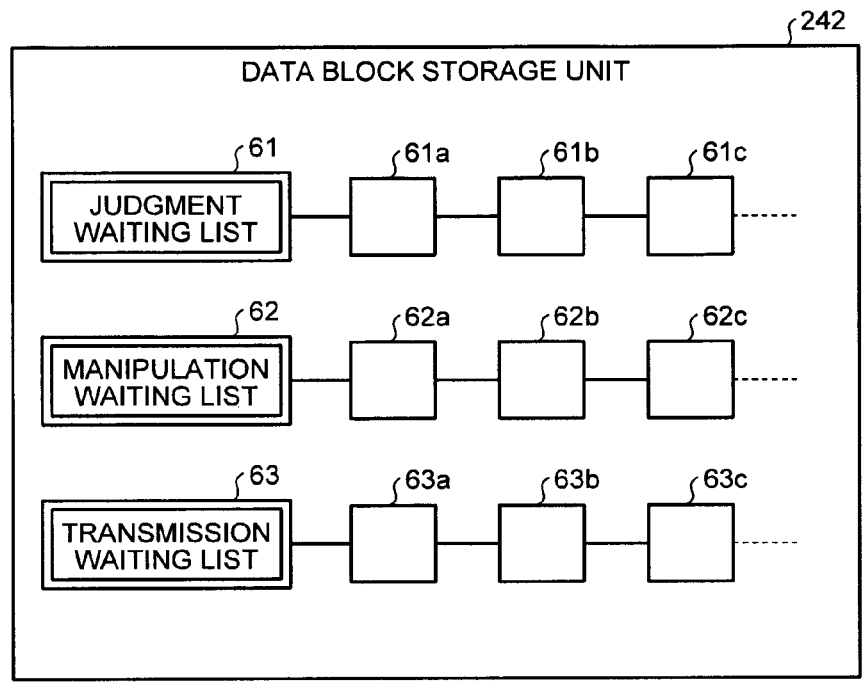
FIG. 7 depicts three lists to which the labels belong.
FIG. 8 depicts an example of manipulation definition information.

A management method of the label in the data block storage unit 242 is herein described. FIG. 7 depicts three lists to which the labels belong. As illustrated in FIG. 7, there are a judgment waiting list 61 to which labels 61a to 61c and the like belong, a manipulation waiting list 62 to which labels 62a to 62c and the like belong, and a transmission waiting list 63 to which labels 63a to 63c and the like belong in the data block storage unit 242. In the data block storage unit 242, each label is managed to belong to any one of the lists.

The judgment waiting list 61 is the list at the bottom of which the label newly stored in the data block storage unit 242 by the storing unit 213 is added. For the labels added to the judgment waiting list 61, the manipulation method of the data block is sequentially judged by the manipulation processing unit 220 from the top of the list. Then, the label judged that the data block corresponding to which is required to be manipulated is moved to the bottom of the manipulation waiting list 62, and the label judged that the data block corresponding to which is not required to be manipulated is moved to the bottom of the transmission waiting list 63. The label added to the manipulation waiting list 62 is sequentially moved to the bottom of the transmission waiting list 63 in the order of completion of the manipulation of the data block by the manipulation processing unit 220. Then, the label added to the bottom of the transmission waiting list 63 becomes an object of the transmission process by the transmission processing unit 230 in the order from the top of the list.

In this manner, by managing the labels by the three lists, the reception processing unit 210, the manipulation processing unit 220 and the transmission processing unit 230 may define the label being the object of the process, and it becomes easy that they independently execute the process in parallel.

Returning to the description of FIG. 4, the manipulation processing unit 220 has a manipulation judging unit 221 and a manipulating unit 222. The manipulation judging unit 221 judges the manipulation necessary for each data block stored in the data block storage unit 242 and sets the result of judgment in the item of the manipulation method of the corresponding label.

The manipulation judging unit 221 sequentially judges the labels from the top of the judgment waiting list 61 and moves the label corresponding to the data block of which manipulation is judged to be necessary to the bottom of the manipulation waiting list 62. Also, the manipulation judging unit 221 moves the label corresponding to the data block of which manipulation is judged to be not necessary to the bottom of the transmission waiting list 63.

The manipulation judging unit 221 judges the manipulation necessary for the data block by checking the values of the data type and the destination set in the corresponding label against manipulation definition information 71 stored in a manipulation definition information storage unit 243 of the storage unit 240. An example of the manipulation definition information 71 is illustrated in FIG. 8. As illustrated in FIG. 8, the manipulation definition information 71 has the items such as the data type, the destination and the manipulation method, and is configured to be able to register a plurality of combinations of the destination and the manipulation method for each data type.

The data type in the manipulation definition information 71 indicates the type of the data and corresponds to the value of the data type of the label. The destination indicates the destination address of the transmitted data and corresponds to the value of the destination of the label. The manipulation method indicates the manipulation method, which should be executed to the data block. Meanwhile, there is a case in which "*" is included in the destination of the manipulation definition information 71, and "*" serves as a wild card, which matches an optional value. Also, when a value "no manipulation" is set as the manipulation method, this means that the manipulation is not necessary for the data block.

In an example illustrated in FIG. 8, the combination of the destination, "*" and the manipulation method "ZIP compression" is registered for the data type "text". This indicates that, when the value set as the data type of the label is "text", the manipulation "ZIP compression" is necessary for the data block regardless of the value set as the destination of the label.

Also, in the example illustrated in FIG. 8, for the data type "JPEG image", the combination of the destination "192.168.10.*" and the manipulation method "reduction (320×240) and the combination of the destination "*" and the manipulation method "no manipulation" are registered.

This indicates that the manipulation "reduction (320×240) is required for the data block when the value is set as the data type of the label is "JPEG image" and the value set as the destination of the label starts with "192.168.10.". Also, this indicates that the manipulation of the data block is not necessary when the value set as the data type of the label is "JPEG image" and the value set as the destination of the label does not start with "192.168.10.".

In this manner, by judging the manipulation method by taking the address of the destination into account, it becomes possible to manipulate the data included in the transmitted data according to a requirement of the destination. For example, operation to reduce the image data according to the resolution of the display unit of a cell phone when transmitting the transmitted data including the image data to an address of a cell phone provider, and to directly transmit the image data to an address other than that becomes possible.

Also, as the manipulation definition information 71, various manipulation methods such as character code conversion, encoding, application of electric signature, check of virus and deletion of inadequate data may be registered in addition to the above-described manipulation method.

The manipulating unit 222 manipulates the data block according to the result of judgment of the manipulation judging unit 221. Specifically, the manipulating unit 222 sequentially refers to a value of the manipulation method and the like of the label from the top of the manipulation waiting list 62, and when there is the label of which manipulation may be performed, this manipulates the corresponding data block according to the value of the manipulation method and moves the label to the bottom of the transmission waiting list 63.

The manipulation executed by the manipulating unit 222 includes the one, which may be executed in a unit of data block, and the one, which cannot be executed unless all the data blocks clipped from the same data are assembled. For example, the manipulation to compress the text may be executed in the unit of data block. In this manner, when the manipulation method, which may be executed in the unit of data block, is set in the label, the manipulating unit 222 judges that the manipulation may be performed to the data block corresponding to the label and immediately executes the manipulation.

On the other hand, it is required that entire image data be assembled for the manipulation to reduce the number of pixels by reducing the image data, for example. In this manner, when the manipulation method, which cannot be executed unless all the data blocks clipped from the same data are assembled, is set in the label, the manipulating unit 222 withholds the execution of the manipulation of the data blocks until all the data blocks clipped from the same data are assembled.

Meanwhile, it may be judged whether all the data blocks clipped from the same data are assembled by whether the data ending flag or the transmitted data ending flag is set in the label. The clipping of the data block from the transmitted data is performed from the top and the label is sequentially added to the manipulation waiting list 62 in the order of the clipping of the data block. Therefore, when the manipulation method is already judged for the label in which the data ending flag or the transmitted data ending flag is set, it may be regarded that the judgment of the manipulation method is already completed for all the data blocks before the same clipped from the same data.

When all the data blocks clipped from the same data are assembled, the manipulating unit 222 concatenates the data blocks to reproduce the data included in the transmitted data and executes the manipulation to the reproduced data. The operation of the manipulating unit 222 when concatenating a plurality of data blocks to manipulate is described with reference to FIG. 9.

Figure 9:
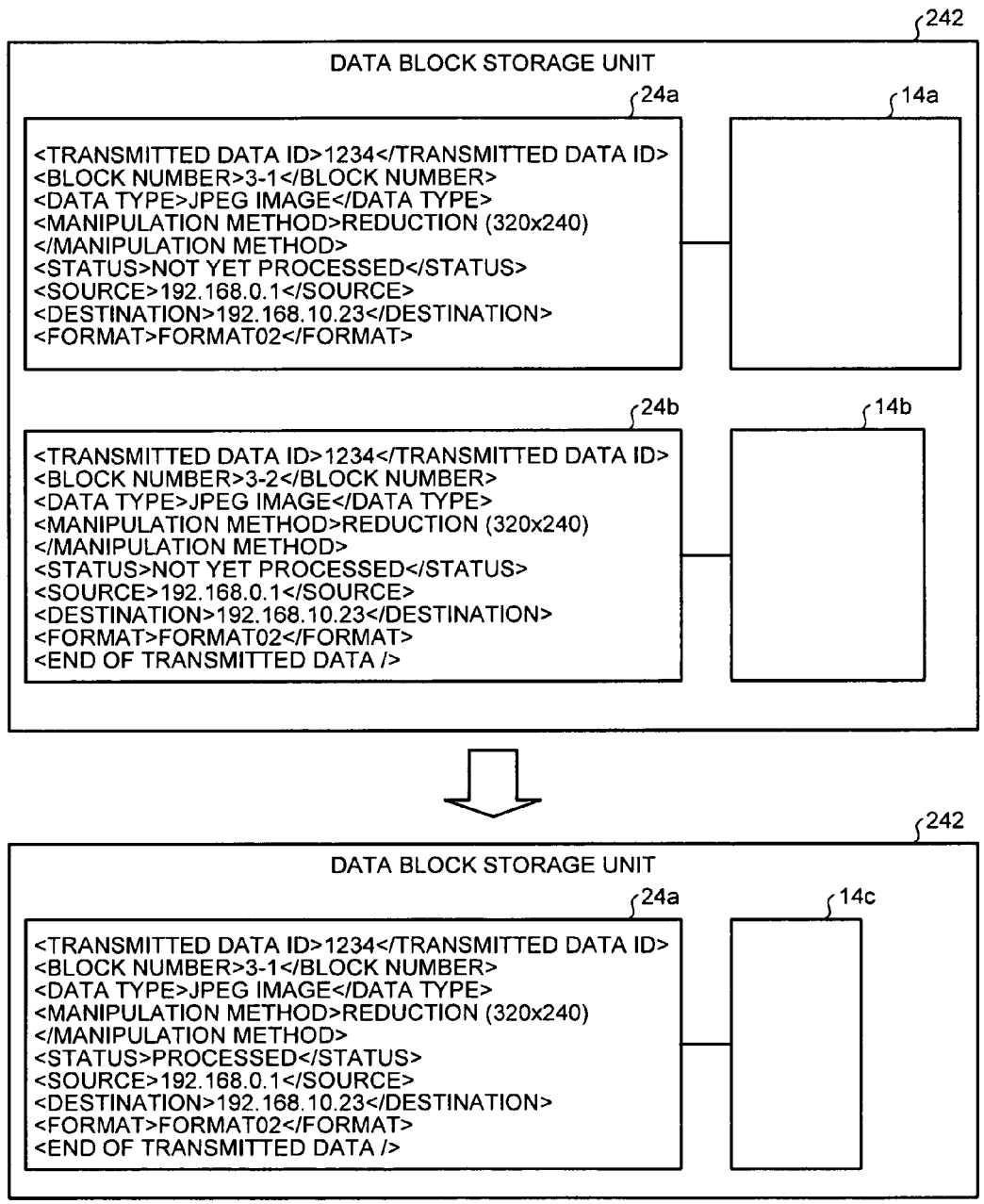
FIG. 9 depicts an example of concatenating a plurality of data blocks to manipulate.

In an example illustrated in FIG. 9, a combination of a data block 14a and a label 24a and a combination of a data block 14b and a label 24b are stored in a data block storage unit 242. In the label 24a, "reduction (320×240)" is set as the manipulation method, and the manipulating unit 222 judges that it is necessary that all the data blocks clipped from the same data be assembled for manipulating the data block 14a corresponding to the label 24a.

Then, the manipulating unit 222 confirms whether the data ending flag or the transmitted data ending flag is set in the label 24a. In a case of this example, since the flags are not set in the label 24a, the manipulating unit 222 judges that all the data blocks clipped from the same data are not yet assembled, and withholds the execution of the manipulation at this stage.

Subsequently, the manipulating unit 222 confirms the label 24b. In the label 24a, "reduction (320×240)" is set as the manipulation method, and the manipulating unit 222 judges that it is necessary that all the data blocks clipped from the same data be assembled for manipulating the data block 14b corresponding to the label 24b.

Then, the manipulating unit 222 confirms whether the data ending flag or the transmitted data ending flag is set in the label 24b. In a case of this example, since the transmitted data ending flag is set in the label 24b, the manipulating unit 222 judges that all the data blocks clipped from the same data are already assembled.

Subsequently, the manipulating unit 222 searches the label corresponding to another data block clipped from the same data. Specifically, the manipulating unit 222 obtains the values of the transmitted data ID and the block number from the label 24b and obtains the label having the value of the transmitted data ID and the part before "-" of the value of the block number identical to those of the label 24b.

As a result of the above-described search, the label 24a is searched, and the manipulating unit 222 judges that the data block 14a corresponding to the label 24a and the data block 14b corresponding to the label 24b are clipped from the same data. Then, the manipulating unit 222 executes the manipulation corresponding to the manipulation method "reduction (320×240)" to the data obtained by concatenating the data blocks 14a and 14b.

Then, the manipulating unit 222 stores the data obtained by the manipulation in the data block storage unit 242 as a data block 14c and associates the same with the label 24a of which block number is the smallest out of the labels corresponding to the data blocks before the manipulation. Then, the manipulating unit 222 deletes the label 24b and the data blocks 14a and 14b, which become unnecessary, and resets the transmitted data ending flag set in the label 24b in the label 24a.

Returning to the description of FIG. 4, the transmission processing unit 230 has a block header adding unit 231 and a transmitting unit 232. The block header adding unit 231 generates the block header from the label corresponding to the data block of which manipulation is completed and the data block of which manipulation is judged to be not necessary to add to the data block. The transmitting unit 232 transmits the data block to which the data header is added to the destination.

As described above, the label corresponding to the data block of which manipulation is completed and the data block of which manipulation is judged to be not necessary is added to the transmission waiting list 63, and the block header adding unit 231 obtains the label from the top of the transmission waiting list 63 to generate the block header. In the generated block header, information necessary to reconfigure the transmitted data in the device of the destination out of the information set in the label is set.

Figure 10:
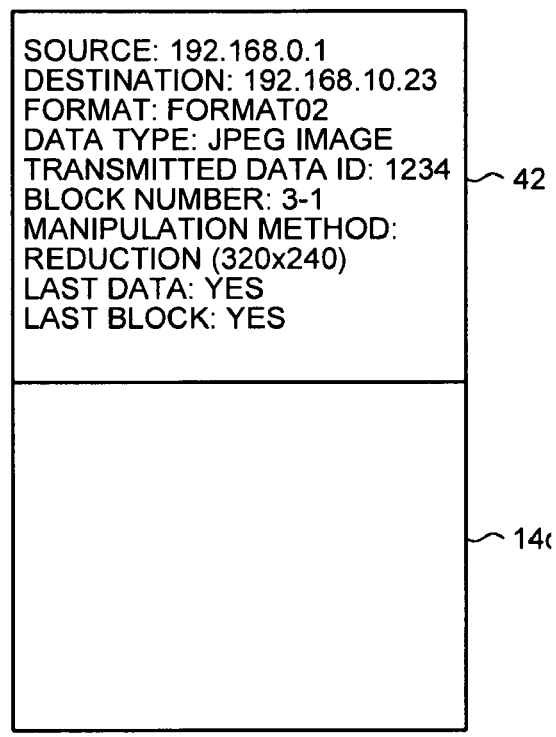
FIG. 10 depicts an example of the data block to which a block header is added.

FIG. 10 depicts an example of the data block to which the block header is added. In FIG. 10, a block header 42 added to the data block 14c is generated from the label 24a illustrated in FIG. 9 and has the items such as the source, the destination, the format, the data type, the block number, the manipulation method, the data ending flat and the transmitted data ending flag.

Figure 11:
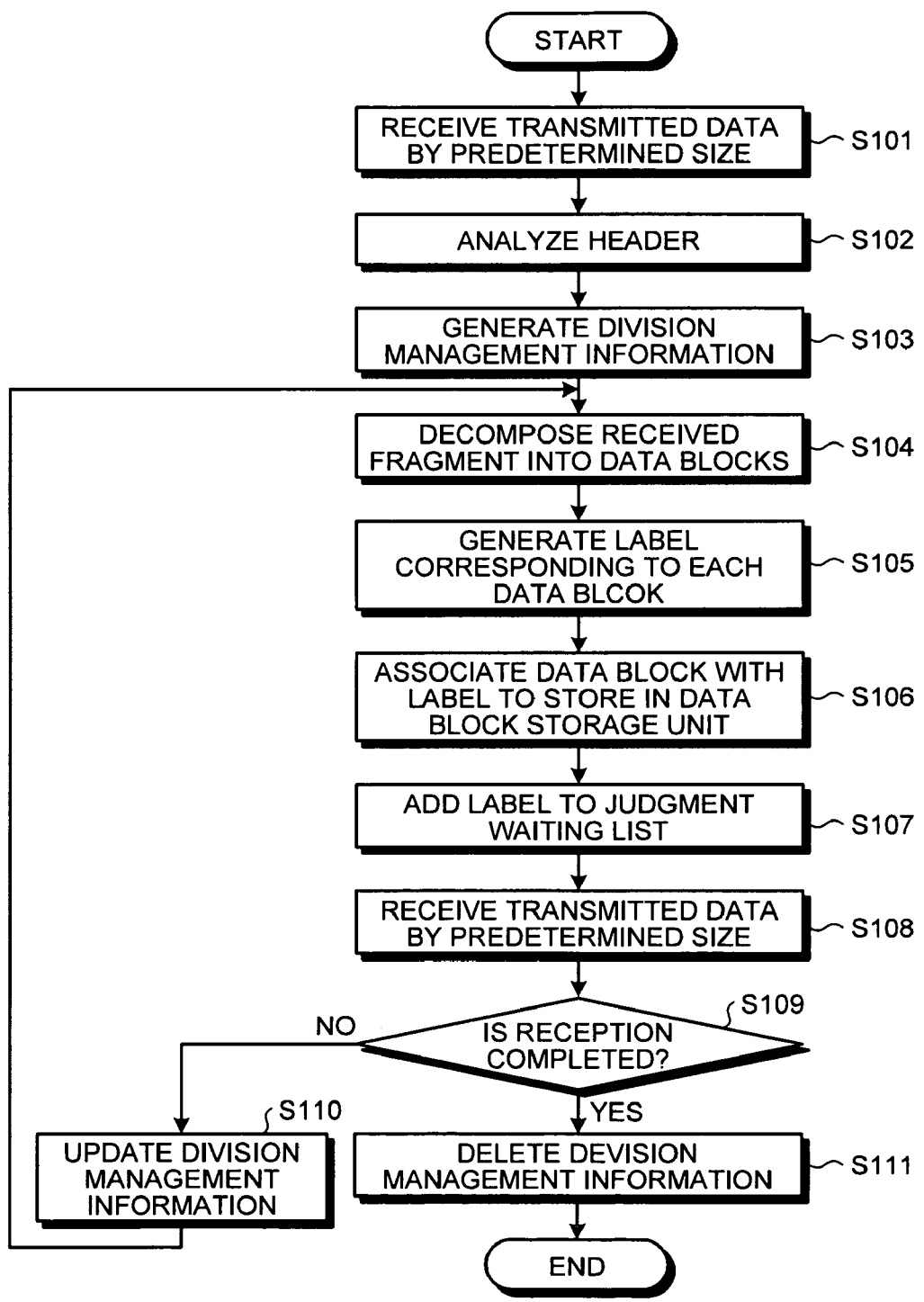
FIG. 11 is a flowchart illustrating a procedure of a transmitted data reception process by a reception processing unit.

Next, a procedure of the data relay device 200 illustrated in FIG. 4 is described. FIG. 11 is a flowchart illustrating a procedure of a transmitted data reception process by the reception processing unit 210. The transmitted data reception process is executed each time the transmitted data is received.

As illustrated in FIG. 11, the receiving unit 211 first receives the transmitted data by a predetermined size from the top (step S101). Subsequently, the dividing unit 212 analyzes the header included in the received fragment (step S102) and generates the division management information to store in the division management information storage unit 241 (step S103).

Then, the dividing unit 212 divides the received fragment into the data blocks based on the division management information (step S104) and generates the label corresponding to each divided data block (step S105). Then, the storing unit 213 associates the data block with the label to store in the data block storage unit 242 (step S106), and further adds the label to the bottom of the judgment waiting list 61 (step S107).

Subsequently, the receiving unit 211 receives the transmitted data by the predetermined size and obtains the next fragment (step S108). Herein, when the next fragment may be obtained (step S109: No), the dividing unit 212 updates the division management information based on the obtained fragment (step S110), and thereafter the step S104 and the subsequent steps are executed again.

On the other hand, when the next fragment cannot be obtained at the step S108, that is to say, when the reception of the transmitted data is completed (step S109: Yes), the dividing unit 212 deletes the division management information and the transmitted data reception process is finished (step S111).

Figure 12:
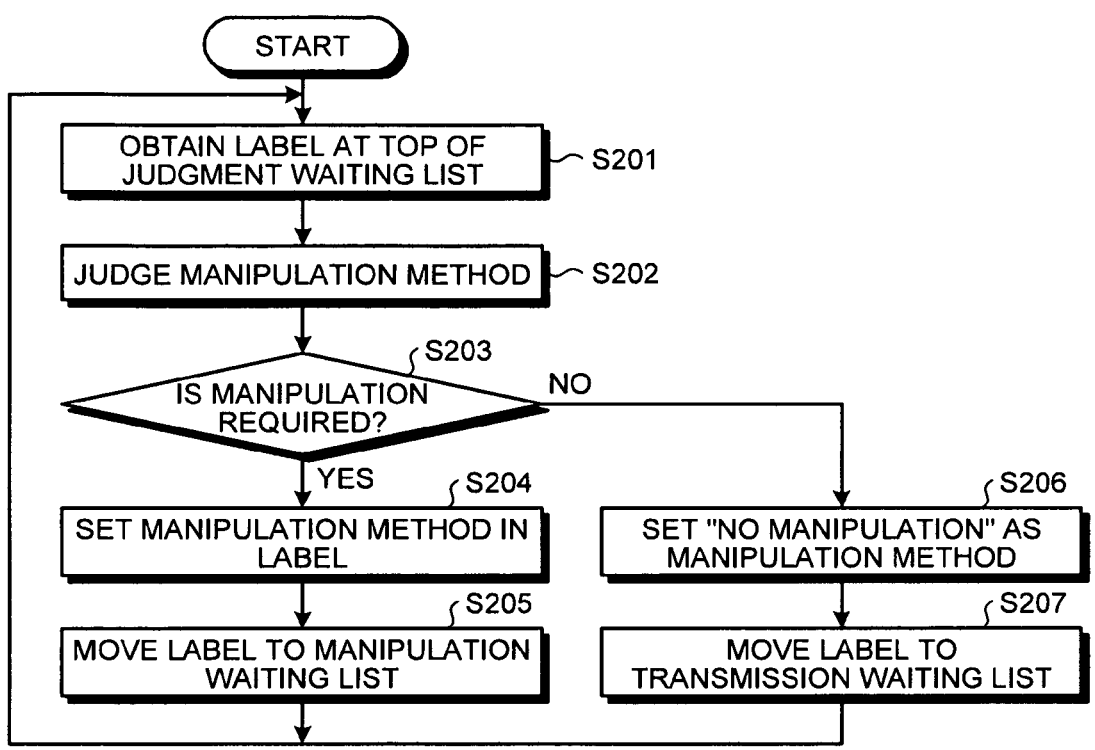
FIG. 12 is a flowchart illustrating a procedure of a manipulation method judgment process by the manipulation judging unit.

FIG. 12 is a flowchart illustrating a procedure of a manipulation method judgment process by the manipulation judging unit 221. The manipulation method judgment process is continuously executed by the manipulation judging unit 221 while the data relay device 200 operates.

As illustrated in FIG. 12, the manipulation judging unit 221 first obtains the label at the top of the judgment waiting list 61. Herein, when the judgment waiting list 61 is empty, the manipulation judging unit 221 waits for the addition of the label to the judgment waiting list 61 and obtains the same (step S201). Then, the manipulation judging unit 221 checks the data type and the destination of the obtained label against the manipulation definition information stored in advance in the manipulation definition information storage unit 243 to judge the manipulation method (step S202).

Herein, when the judged manipulation method is other than "no manipulation", that is to say, when the manipulation of the data block is necessary (step S203: Yes), the manipulation judging unit 221 sets the judged manipulation method in the label (step S204). Then, the manipulation judging unit 221 moves the label to the manipulation waiting list 62 (step S205), and thereafter executes again the step S201 and the subsequent steps.

On the other hand, when the judged manipulation method is "no manipulation", that is to say, when the manipulation of the data block is not necessary (step S203: No), the manipulation judging unit 221 sets "no manipulation" in the label (step S206). Then, the manipulation judging unit 221 moves the label to the transmission waiting list 63 (step S207), and thereafter executes again the step S201 and the subsequent steps.

Figure 13:
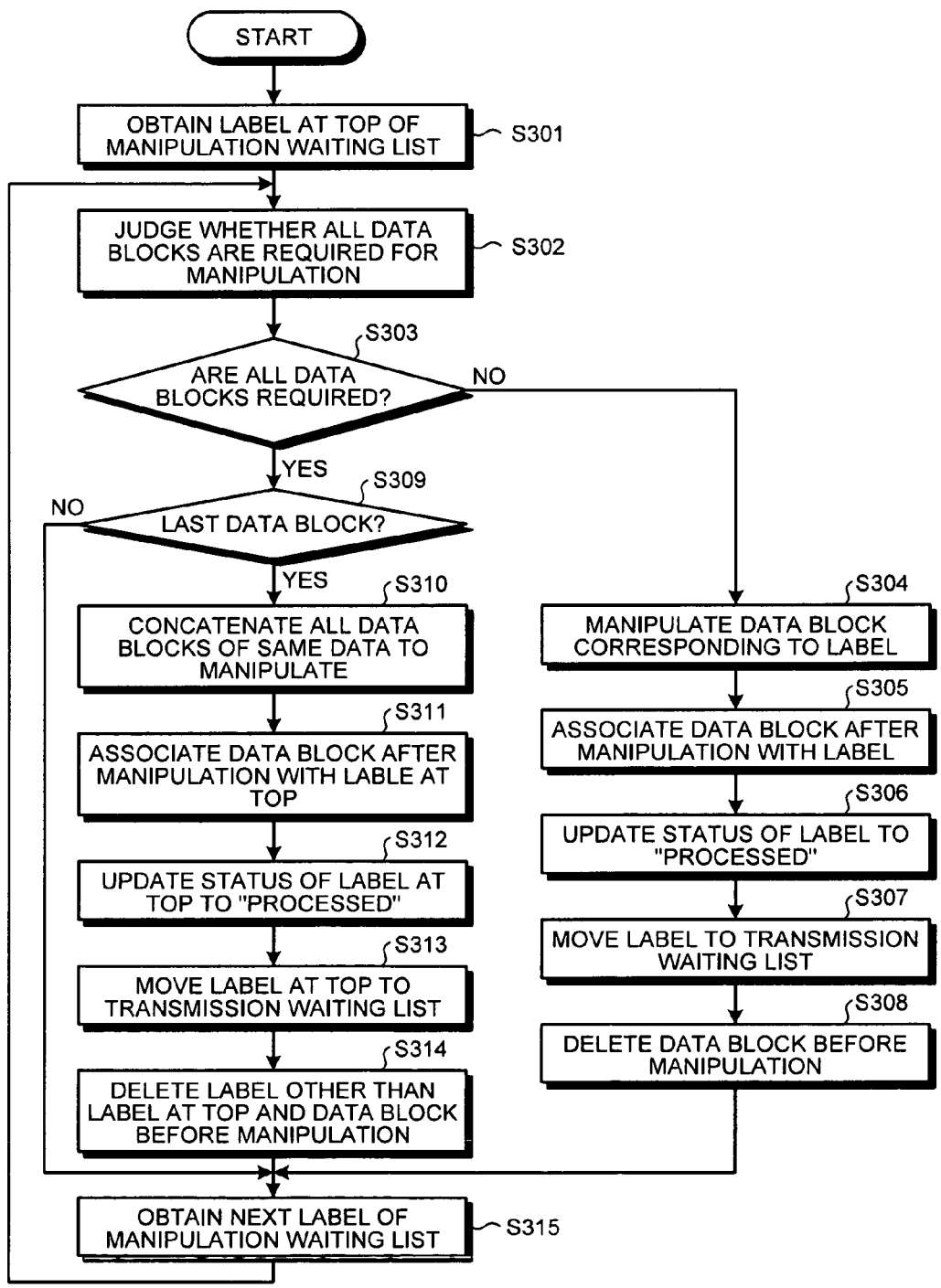
FIG. 13 is a flowchart illustrating a procedure of a manipulation execution process by the manipulating unit.

FIG. 13 is a flowchart illustrating a procedure of a manipulation execution process by the manipulating unit 222. The manipulation execution process is continuously executed by the manipulating unit 222 while the data relay device 200 operates.

As illustrated in FIG. 13, the manipulating unit 222 first obtains the label at the top of the manipulation waiting list 62. Herein, when the manipulation waiting list 62 is empty, the manipulating unit 222 waits for the addition of the label to the manipulation waiting list 62 and obtains the same (step S301). Then, the manipulating unit 222 judges whether all the data blocks clipped from the same data are necessary for manipulating the data block corresponding to the obtained label (step S302).

Herein, when the manipulating unit 222 judges that not all the data blocks are necessary (step S303: No), this manipulates the data block corresponding to the label (step S304) and associates the data block newly generated by the manipulation with the label (step S305). Then, the manipulating unit 222 updates the status of the label to "processed" (step S306) and moves the label to the bottom of the transmission waiting list 63 (step S307).

Then, after deleting the data block before the manipulation (step S308), the manipulating unit 222 obtains a next label of the manipulation waiting list 62 (step S315) and executes again the step S302 and the subsequent steps. Meanwhile, when there is not the next label in the manipulation waiting list 62 at the step S315, the manipulating unit 222 waits for the addition of the label to the manipulation waiting list 62 and obtains the same.

On the other hand, when the manipulating unit 222 judges that all the data blocks are necessary at the step S302 (step S303: Yes), this confirms whether the data ending flag or the transmitted data ending flag is set in the label, thereby judging whether the data block corresponding to the label is the last data block clipped from the same data. Then, when the data block corresponding to the label is the last data block (step S309: Yes), the manipulating unit 222 concatenates all the data blocks clipped from the same data to manipulate (step S310).

Then, the manipulating unit 222 associates the data block newly generated by the manipulation with the label at the top of which block number is the smallest out of the labels corresponding to the concatenated data blocks (step S311). Then, the manipulating unit 222 updates the status of the label at the top to "processed" (step S312) and moves the label at the top to the bottom of the transmission waiting list 63 (step S313).

Then, after deleting the labels other than the label at the top out of the labels corresponding to the concatenated data blocks and the data block before the manipulation (step S314), the manipulating unit 222 obtains the next label of the manipulation waiting list 62 (step S315) and executes again the step S302 and the subsequent steps.

Also, when the data block corresponding to the obtained label is not the last data block (step S309: No), the manipulating unit 222 obtains the next label of the manipulation waiting list 62 without manipulating the data block (step S315) and executes again the step S302 and the subsequent steps.

Figure 14:
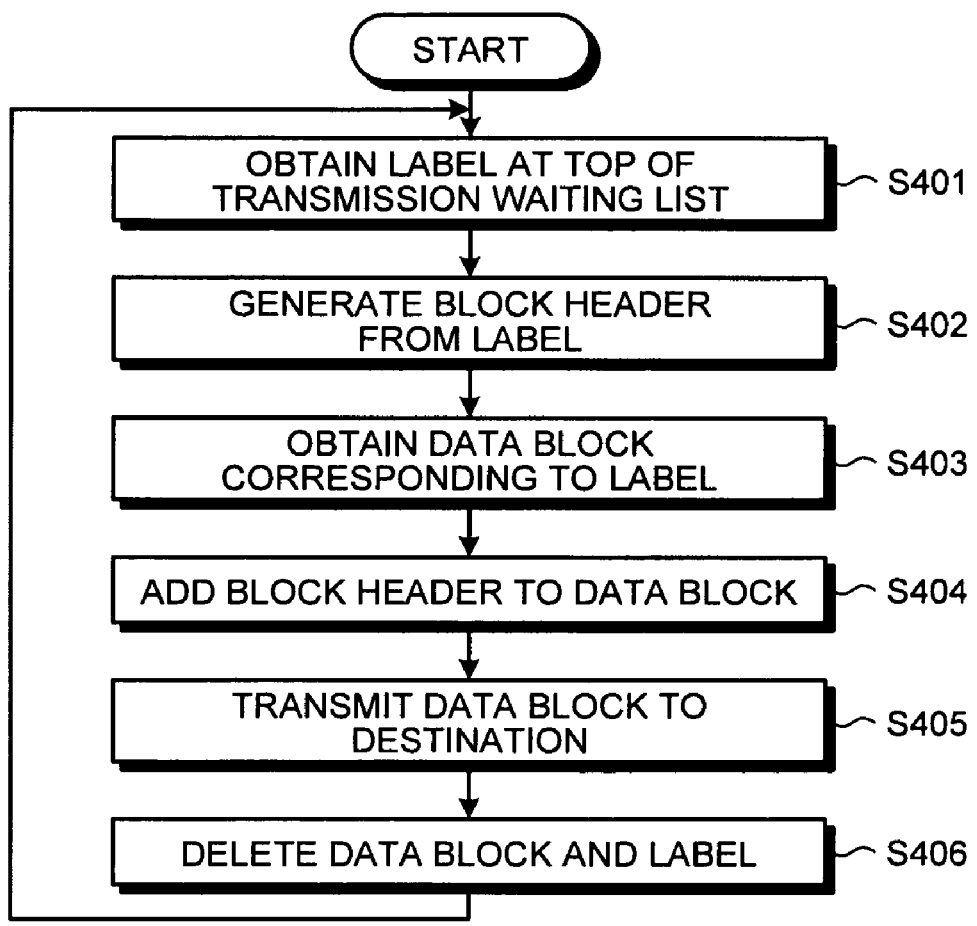
FIG. 14 is a flowchart illustrating a procedure of the data block transmission process by a transmission processing unit.

FIG. 14 is a flowchart illustrating a procedure of the data block transmission process by the transmission processing unit 230. The data block transmission process is continuously executed by the transmission processing unit 230 while the data relay device 200 operates.

As illustrated in FIG. 14, the block header adding unit 231 first obtains the label at the top of the transmission waiting list 63. Herein, when the transmission waiting list 63 is empty, the block header adding unit 231 waits for the addition of the label to the transmission waiting list 63 and obtains the same (step S401). Then, the block header adding unit 231 generates the block header from the obtained label (step S402).

Subsequently, the block header adding unit 231 obtains the data block corresponding to the label (step S403) and adds the block header to the obtained data block (step S404). Then, the transmitting unit 232 transmits the data block to which the block header is added to the destination (step S405) and the block header adding unit 231 deletes the transmitted data block and the label corresponding to the same from the data block storage unit 242 (step S406). Thereafter, the transmission processing unit 230 executes again the step S401 and the subsequent steps.

Figure 15:
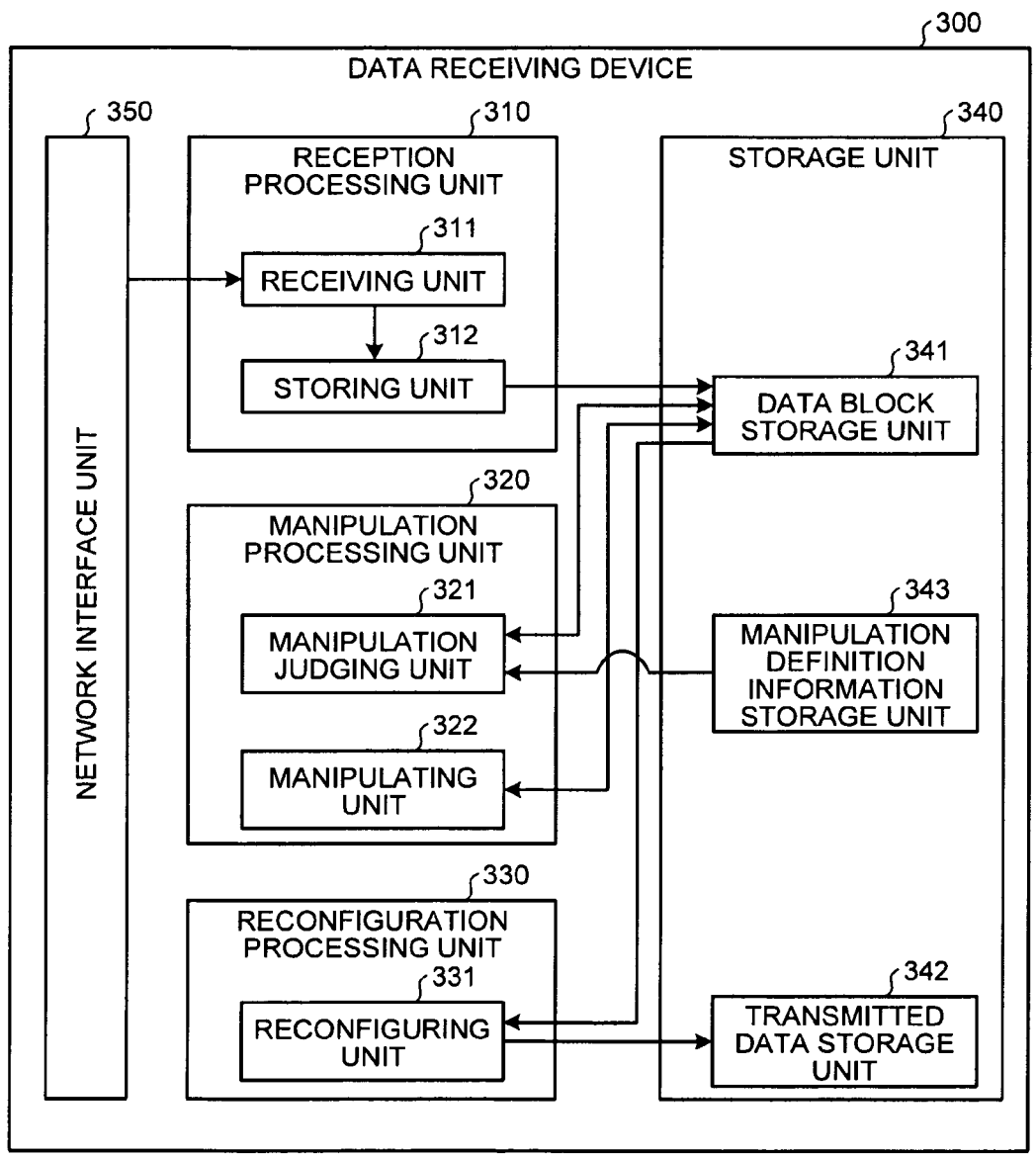
FIG. 15 is a block diagram illustrating a configuration of the data receiving device.

Next, a configuration of the data receiving device 300 illustrated in FIG. 1 is described. FIG. 15 is a block diagram illustrating the configuration of the data receiving device 300. As illustrated in FIG. 15, the data receiving device 300 has a reception processing unit 310, a manipulation processing unit 320, a reconfiguration processing unit 330, a storage unit 340 and a network interface unit 350. The network interface unit 350 is the interface device for communicating with another information processing device through the network.

The reception processing unit 310 has a receiving unit 311 and a storing unit 312. The receiving unit 311 receives a combination of the data block and the block header transmitted from the data relay device 200. The storing unit 312 generates the label from the received block header and associates the data block with the label to store in a data block storage unit 341 of the storage unit 340.

Figure 16:
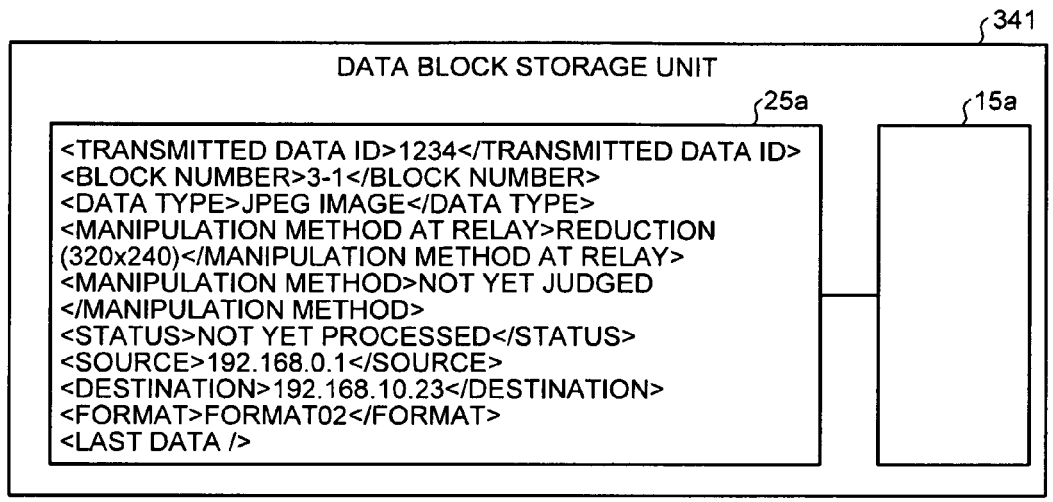
FIG. 16 depicts an example of the label and the data block stored in the data block storage unit.

FIG. 16 depicts an example of the label and the data block stored in the data block storage unit 341. In an example illustrated in FIG. 16, a label 25a is associated with a data block 15a to be stored. The label 25a has the item of a manipulation method at relay in addition to the items included in the label 22a and the like stored in the data block storage unit 242 of the data relay device 200. This is the item to which the value of the manipulation method set in the block header is transcribed, and this indicates the manipulation executed to the corresponding data block in the data relay device 200.

Figure 17:
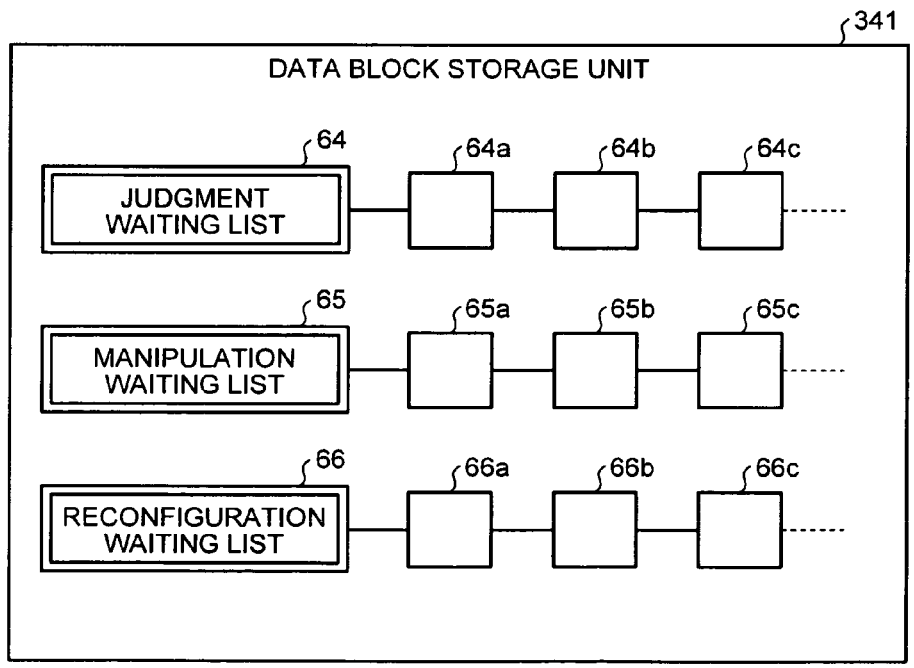
FIG. 17 depicts three lists to which the labels belong.

The management method of the label in the data block storage unit 341 is herein described. FIG. 17 depicts three lists to which the labels belong. As illustrated in FIG. 17, there are a judgment waiting list 64 to which labels 64a to 64c and the like belong, a manipulation waiting list 65 to which labels 65a to 65c and the like belong and a reconfiguration waiting list 66 to which labels 66a to 66c and the like belong in the data block storage unit 341. In the data block storage unit 341, each label is managed to belong to any of the lists.

The judgment waiting list 64 is a list at the bottom of which the label newly stored in the data block storage unit 341 by the storing unit 312 is added. For the labels added to the judgment waiting list 64, the manipulation method of the data block is sequentially judged by the manipulation processing unit 320 from the top of the list. Then, the label judged that the data block corresponding to which is required to be manipulated is moved to the bottom of the manipulation waiting list 65, and the label judged that the data block corresponding to which is not required to be manipulated is moved to the bottom of the reconfiguration waiting list 66. The label added to the manipulation waiting list 65 is sequentially moved to the bottom of the reconfiguration waiting list 66 in the order of completion of the manipulation of the data block by the manipulation processing unit 320. Then, each label added to the reconfiguration waiting list 66 becomes an object of a reconfiguration process by the reconfiguration processing unit 330 when all the labels corresponding to the data blocks obtained from the same transmitted data are assembled.

Returning to the description of FIG. 15, the manipulation processing unit 320 has a manipulation judging unit 321 and a manipulating unit 322. The manipulation judging unit 321 judges necessary manipulation for each data block stored in the data block storage unit 341 and sets a result of judgment in the item of the manipulation method of the corresponding label.

The manipulation judging unit 321 sequentially judges from the label at the top of the judgment waiting list 64 and moves the label corresponding to the data block of which manipulation is judged to be necessary to the bottom of the manipulation waiting list 65. Also, the manipulation judging unit 321 moves the label corresponding to the data block of which manipulation is judged to be not necessary to the bottom of the reconfiguration waiting list 66.

Figures 18, 19:
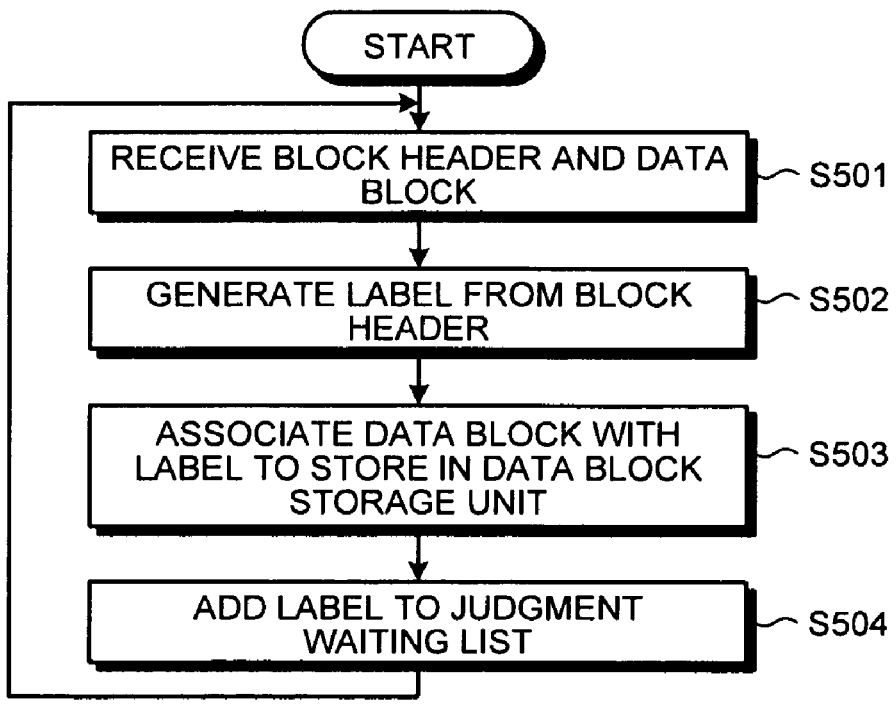
FIG. 18 depicts an example of the manipulation definition information.
FIG. 19 is a flowchart illustrating a procedure of the reception process by the reception processing unit.

The manipulation judging unit 321 judges the manipulation necessary for the data block by checking the values of the data type and the manipulation method at relay set in the corresponding label against manipulation definition information 72 stored in a manipulation definition information storage unit 343 of the storage unit 340. An example of the manipulation definition information 72 is illustrated in FIG. 18. As illustrated in FIG. 18, the manipulation definition information 72 has the items such as the data type, the manipulation method at relay and the manipulation method, and is configured to be able to register a plurality of combinations of the manipulation method at relay and the manipulation method for each data type.

The data type in the manipulation definition information 72 indicates the type of the data and corresponds to the value of the data type of the label. The manipulation method at relay indicates the manipulation method executed by the data relay device 200 and corresponds to the value of the manipulation method at relay of the label. The manipulation method indicates the manipulation method, which should be executed to the data block. Meanwhile, the manipulation method set in the item of the manipulation method may be that for returning the data to a state before the manipulation by the data relay device 200 or other than the same. Also, when the value "no manipulation" is set as the manipulation method, this means that the manipulation is not necessary for the data block.

In the example illustrated in FIG. 18, a combination of the destination "ZIP compression" and the manipulation method "ZIP decompression" is registered for the data type "text". This indicates that, when the value set as the data type of the label is "text" and the value set as the manipulation method at relay is "ZIP compression, the manipulation "ZIP decompression" is necessary for the data block.

The manipulating unit 322 manipulates the data block according to the result of judgment of the manipulation judging unit 321. Specifically, the manipulating unit 322 sequentially obtains the label from the top of the manipulation waiting list 65 and manipulates the data block corresponding to the label according to the value of the manipulation method of the label and moves the label to the bottom of the reconfiguration waiting list 66.

The reconfiguration processing unit 330 has a reconfiguring unit 331. The reconfiguring unit 331 reconfigures the transmitted data based on the data block of which manipulation is completed and the data block of which manipulation is judged to be not necessary and the labels corresponding to them, and stores the reconfigured transmitted data in a transmitted data storage unit 342 of the storage unit 340.

As described above, the labels corresponding to the data block of which manipulation is completed and the data block of which manipulation is judged to be not necessary are added to the reconfiguration waiting list 66. Then, the reconfiguring unit 331 executes the reconfiguration when all the labels necessary to reconfigure the transmitted data are assembled in the reconfiguration waiting list 66. The fact that all the labels necessary to reconfigure the transmitted data are assembled may be judged based on the fact that there is no lack of number and the label in which the data ending flag is set and the label in which the transmitted data ending flag is set are on appropriate positions when the labels having the same transmitted data ID are arranged in the order of the block number.

Next, a procedure of the data receiving device 300 illustrated in FIG. 15 is described. FIG. 19 is a flowchart illustrating a procedure of the reception process by the reception processing unit 310. The reception process is continuously executed by the reception processing unit 310 while the data receiving device 300 operates.

As illustrated in FIG. 19, the receiving unit 311 receives the block header and the data block from the data relay device 200 (step S501). Subsequently, the storing unit 312 generates the label from the received block header (step S502), and associates the data block with the label to store in the data block storage unit 341 (step S503). Then, the storing unit 312 adds the label to the bottom of the judgment waiting list 64 (step S504). Thereafter, the step S501 and the subsequent steps are executed again.

Figure 20:
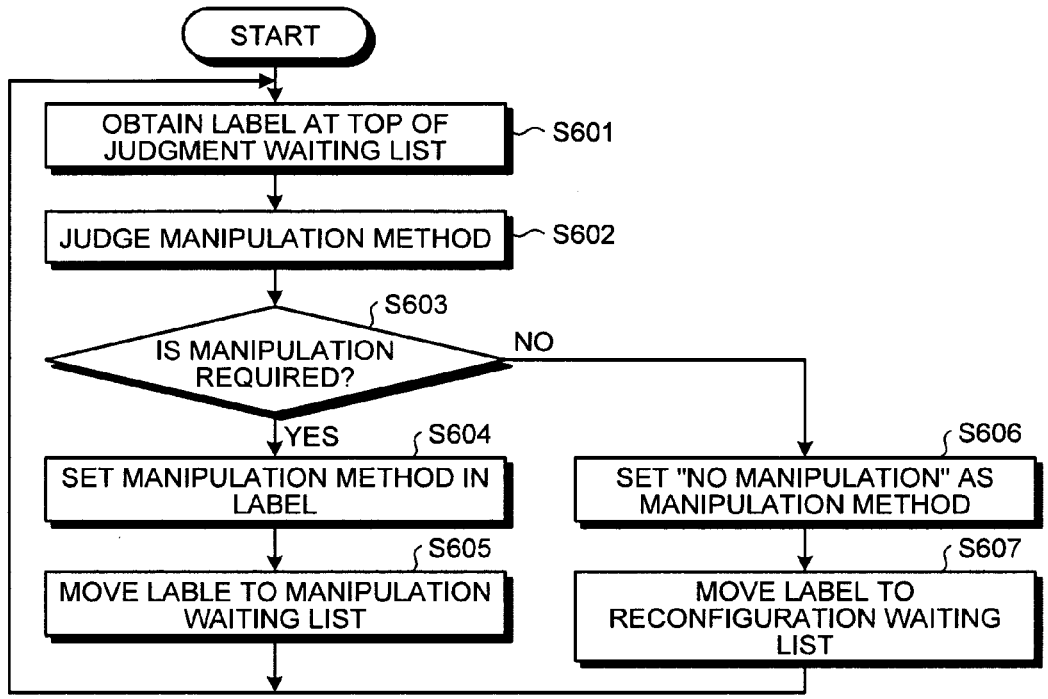
FIG. 20 is a flowchart illustrating a procedure of the manipulation method judgment process by the manipulation judging unit.

FIG. 20 is a flowchart illustrating a procedure of the manipulation method judgment process by the manipulation judging unit 321. The manipulation method judgment process is continuously executed by the manipulation judging unit 321 while the data receiving device 300 operates.

As illustrated in FIG. 20, the manipulation judging unit 321 first obtains the label at the top of the judgment waiting list 64. Herein, when the judgment waiting list 64 is empty, the manipulation judging unit 321 waits for the addition of the label to the judgment waiting list 64 and obtains the same (step S601). Then, the manipulation judging unit 321 checks the data type and the manipulation method at relay of the obtained label against the manipulation definition information stored in advance in the manipulation definition information storage unit 343 to judge the manipulation method (step S602).

Herein, when the judged manipulation method is other than "no manipulation", that is to say, when the manipulation of the data block is necessary (step S603: Yes), the manipulation judging unit 321 sets the judged manipulation method in the label (step S604). Then, the manipulation judging unit 321 moves the label to the manipulation waiting list 65 (step S605), and thereafter executes again the step S601 and the subsequent steps.

On the other hand, when the judged manipulation method is "no manipulation", that is to say, when the manipulation of the data block is not necessary (step S603: No), the manipulation judging unit 321 sets "no manipulation" in the label (step S606). Then, the manipulation judging unit 321 moves the label to the reconfiguration waiting list 66 (step S607), and thereafter executes again the step S601 and the subsequent steps.

Figure 21:
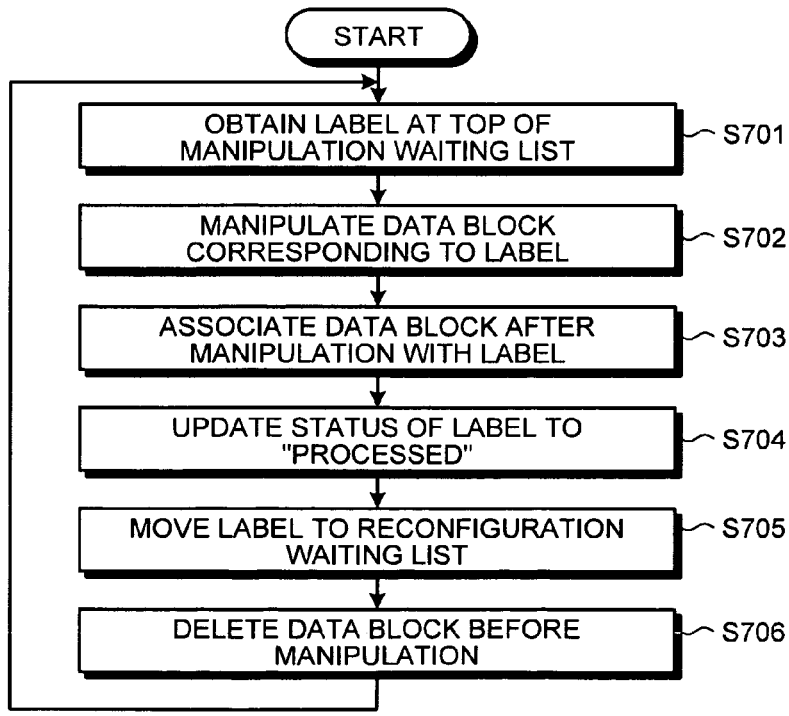
FIG. 21 is a flowchart illustrating a procedure of the manipulation execution process by the manipulating unit.

FIG. 21 is a flowchart illustrating a procedure of the manipulation execution process by the manipulating unit 322. The manipulation execution process is continuously executed by the manipulating unit 322 while the data receiving device 300 operates.

As illustrated in FIG. 21, the manipulating unit 322 first obtains the label at the top of the manipulation waiting list 65. Herein, when the manipulation waiting list 65 is empty, the manipulating unit 322 waits for the addition of the label to the manipulation waiting list 65 and obtains the same (step S701). Then, the manipulating unit 322 manipulates the data block corresponding to the label (step S702), and associates the data block newly generated by the manipulation with the label (step S703).

Then, the manipulating unit 322 updates the status of the label to "processed" (step S704), and moves the label to the bottom of the reconfiguration waiting list 66 (step S705). Then, after deleting the data block before the manipulation (step S706), the manipulating unit 322 executes again the step S701 and the subsequent steps.

Figure 22:
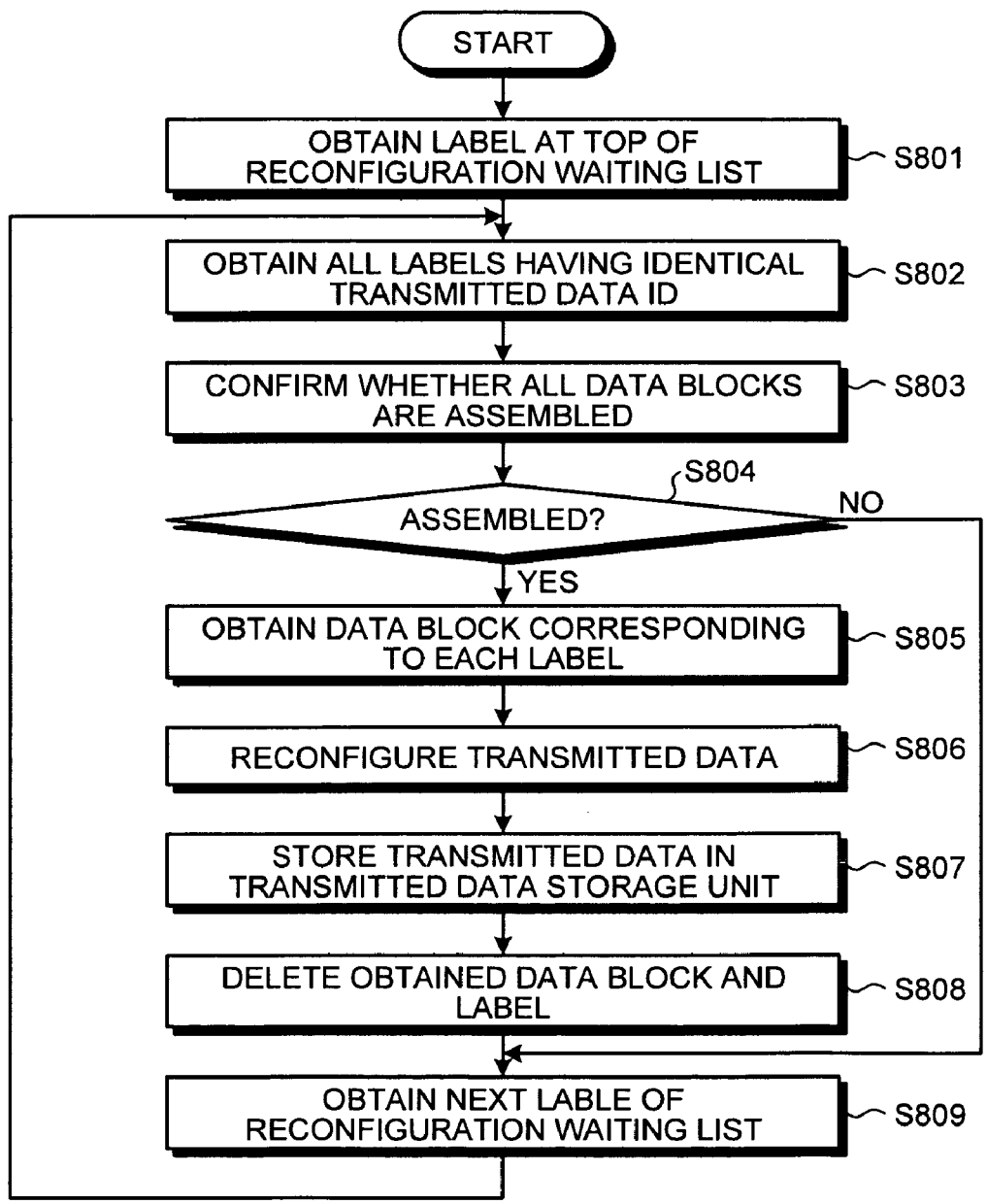
FIG. 22 is a flowchart illustrating a procedure of the reconfiguration process by the reconfiguration processing unit.

FIG. 22 is a flowchart illustrating a procedure of the reconfiguration process by the reconfiguration processing unit 330. The reconfiguration process is continuously executed by the reconfiguration processing unit 330 while the data receiving device 300 operates.

As illustrated in FIG. 22, the reconfiguration processing unit 330 first obtains the label at the top of the reconfiguration waiting list 66. Herein, when the reconfiguration waiting list 66 is empty, the reconfiguration processing unit 330 waits for the addition of the label to the reconfiguration waiting list 66 and obtains the same (step S801). Then, the reconfiguration processing unit 330 obtains the label of which transmitted data ID is identical to that of the obtained label from the reconfiguration waiting list 66 (step S802), and confirms whether all the data blocks necessary to reconfigure the transmitted data are assembled (step S803).

Herein, when all the data blocks are assembled (step S804: Yes), the reconfiguration processing unit 330 obtains the data block corresponding to each label from the data block storage unit 341 (step S805). Then, the reconfiguration processing unit 330 reconfigures the transmitted data from the obtained data blocks and the labels corresponding to them (step S806) and stores the reconfigured transmitted data in the transmitted data storage unit 342 (step S807).

Then, the reconfiguration processing unit 330 deletes the obtained data block and label (step S808) and obtains the next label from the reconfiguration waiting list 66 (step S809) to execute again the step S802 and the subsequent steps. Meanwhile, when there is not the next label in the reconfiguration waiting list 66 at the step S809, the reconfiguration processing unit 330 waits for the addition of the label to the reconfiguration waiting list 66 and obtains the same.

On the other hand, when not all the data blocks are assembled at the step S803 (step S804: No), the reconfiguration processing unit 330 obtains the next label from the reconfiguration waiting list 66 without reconfiguring the transmitted data (step S809) and executes again the step S802 and the subsequent steps.

Meanwhile, the configuration of the data relay device 200 illustrated in FIG. 4 and the configuration of the data receiving device 300 illustrated in FIG. 15 may be changed without departing from the gist thereof. For example, it is also possible to realize a function equivalent to that of the data relay device 200 by implementing functions of the reception processing unit 210, the manipulation processing unit 220 and the transmission processing unit 230 of the data relay device 200 as software and executing the same by a computer. Similarly, a function equivalent to that of the data receiving device 300 may be realized by implementing functions of the reception processing unit 310, the manipulation processing unit 320 and the reconfiguration processing unit 330 of the data receiving device 300 as the software and executing the same by the computer.

Hereinafter, an example of the computer for executing a data relay program 1071 implementing the functions of the reception processing unit 210, the manipulation processing unit 220 and the transmission processing unit 230 of the data relay device 200 as the software is illustrated.

Figure 23:
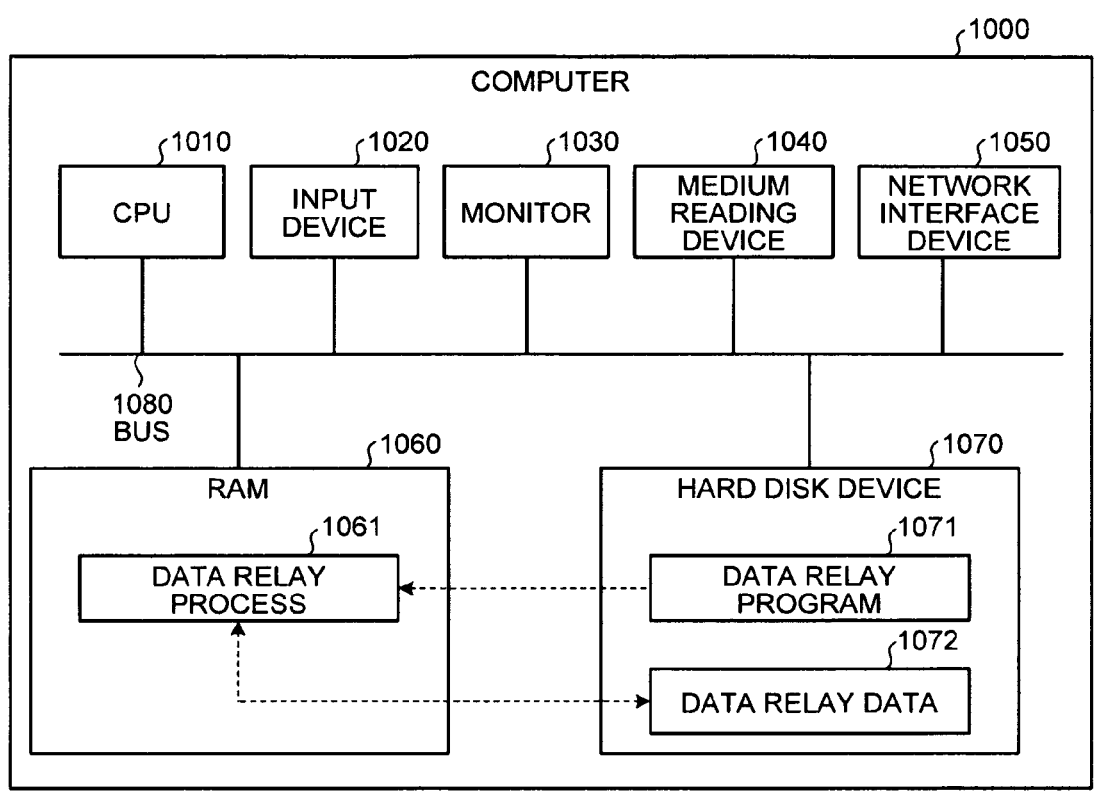
FIG. 23 is a functional block diagram illustrating a computer for executing a data relay program.

FIG. 23 is a functional block diagram illustrating a computer 1000 for executing the data relay program 1071. The computer 1000 is configured such that a central processing unit (CPU) 1010 for executing various types of calculation processing, an input device 1020 for receiving input of the data from a user, a monitor 1030 for displaying various pieces of information, a medium reading device 1040 for reading a program and the like from a storage medium, a network interface device 1050 for communicating data with another computer through the network, a random access memory (RAM) 1060 for temporarily storing the various pieces of information and a hard disk device 1070 are connected to one another by a bus 1080.

Then, in the hard disk device 1070, the data relay program 1071 having the function similar to that of the reception processing unit 210, the manipulation processing unit 220 and the transmission processing unit 230 illustrated in FIG. 4, and data relay data 1072 corresponding to various pieces of data stored in the storage unit 240 illustrated in FIG. 4 are stored. Meanwhile, it is also possible to appropriately disperse the data relay data 1072 to be stored in another computer connected through the network.

Then, the CPU 1010 reads the data relay program 1071 from the hard disk device 1070 to develop in the RAM 1060, and by this, the data relay program 1071 serves as a data relay process 1061. Then, the data relay process 1061 appropriately develops the information read from the data relay data 1072 and the like in an area assigned to itself in the RAM 1060 and executes the various pieces of data processing based on the developed data and the like.

Meanwhile, the above-described data relay program 1071 is not necessarily stored in the hard disk device 1070 and the program stored in the storage medium such as a CD-ROM may be read to be executed by the computer 1000. It is also possible that the program is stored in another computer (or server) and the like connected to the computer 1000 through a public line, the Internet, the local area network (LAN), a wide area network (WAN) and the like and the computer 1000 reads the program from them to execute.

According to an aspect of the invention, since the dividing means divides the transmitted data into the blocks while the first receiving means receives the transmitted data, it becomes possible that the first manipulating means, the transmitting means and the like perform the process in parallel with the first receiving means, so that the time required to relay the transmitted data may be reduced.

Meanwhile, a component, an expression or an optional combination of components of the communication system disclosed in this application may be effectively applied to the method, the device, the system, the computer program, the recording medium, the data structure and the like in order to solve the above-described problem.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication system, comprising:
    a first information processing device;
    a second information processing device; and
    a data relay device for relaying communication between the first and second information processing devices, and
    wherein the data relay device includes:
        a first receiving unit that receives data transmitted from the first information processing device, the transmitted data being capable of including a plurality of types of data;
        a dividing unit that divides the transmitted data while being received by the first receiving unit into a plurality of blocks according to a type of data included in the transmitted data;
        a storing unit that stores, in the storage unit, a block among the plurality of blocks divided by the dividing unit and block management information in which positional information indicating a position of the block in the transmitted data and type information indicating a type of the data including the block are set, in such a way that the block and the block management information are associated with each other;
        a first manipulation judging unit that checks the type information set in the block management information stored in the storage unit against manipulation definition information in which a manipulation method is defined in advance for each type of the data, thereby judging the manipulation method executed to the block corresponding to the block management information, and sets the judged manipulation method in the block management information;
        a first manipulating unit that manipulates the block stored in the storage unit based on the manipulation method judged by the first manipulation judging unit; and
        a transmitting unit that transmits the block manipulated by the first manipulating unit to the second information processing device together with the block management information associated with the block and stored in the storage unit, and
    the second information processing device includes:
        a second receiving unit that receives the block and the block management information;
        a second manipulation judging unit that judges a manipulation method executed to the block corresponding to the block management information based on the type information and the manipulation method included in the block management information;
        a second manipulating unit that manipulates the block based on the manipulation method judged by the second manipulation judging unit; and
        a reconfiguring unit that combines the block manipulated by the second manipulating unit with another block based on the positional information included in the block information management information corresponding to the block to reconfigure the transmitted data.

2. The communication system according to claim 1, wherein the manipulation method of the manipulation definition information is defined in advance for each type of the data and for each destination, and
    the first manipulation judging unit checks the type information set in the block management information and the destination of the transmitted data against the manipulation definition information, thereby judging the manipulation method.

3. The communication system according to claim 1, wherein the storage unit holds the block management information such that the block management information corresponding to the block of which manipulation method is not judged by the first manipulation judging unit, the block management information corresponding to the block of which manipulation method is judged by the first manipulation judging unit but is not manipulated by the first manipulating unit and another block management information are included in different lists.

4. A data relay device, comprising:
    a receiving unit that receives data transmitted from a first information processing device, the transmitted data being capable of including a plurality of types of data;
    a dividing unit that divides the transmitted data while being received by the receiving unit into a plurality of blocks according to a type of data included in the transmitted data;
    a storing unit that stores, in the storage unit, a block among the plurality of blocks divided by the dividing unit and block management information in which positional information indicating a position of the block in the transmitted data and type information indicating a type of the data including the block are set in such a way that the block and the block management information are associated with each other;
    a manipulation judging unit that checks the type information set in the block management information stored in the storage unit against manipulation definition information in which a manipulation method is defined in advance for each type of the data, thereby judging the manipulation method executed to the block corresponding to the block management information, and sets the judged manipulation method in the block management information;
    a manipulating unit that manipulates the block stored in the storage unit based on the manipulation method judged by the manipulation judging unit; and
    a transmitting unit that transmits the block manipulated by the manipulating unit to a second information processing device together with the block management information associated with the block and stored in the storage unit.

5. The data relay device according to claim 4, wherein
    the manipulation method of the manipulation definition information is defined in advance for each type of the data and for each destination, and
    the manipulation judging unit checks the type information set in the block management information and the destination of the transmitted data against the manipulation definition information, thereby judging the manipulation method.

6. The data relay device according to claim 4, wherein the storage unit holds the block management information such that the block management information corresponding to the block of which manipulation method is not judged by the manipulation judging unit, the block management information corresponding to the block of which manipulation method is judged by the manipulation judging unit but is not manipulated by the manipulating unit and another block management information are included in different lists.

7. A data receiving device, comprising:

a receiving unit that receives a block from a second information processing device, the block being obtained by dividing data transmitted by a first information processing device into blocks and by manipulating a block among the divided blocks by the second information processing device and block management information in which positional information indicating a position of the block in the transmitted data, and type information indicating a data type of the block, and a manipulation method are set;

a manipulation judging unit that judges a manipulation method executed to the block corresponding to the block management information based on the type information and the manipulation method included in the block management information;

a manipulating unit that manipulates the block based on the manipulation method judged by the manipulation judging unit; and a reconfiguring unit that reconfigures the transmitted data by combining the block manipulated by the manipulating unit with another block based on the positional information included in the block information corresponding to the block.

* * * * *